US008337923B2

(12) United States Patent
Coyne et al.

(10) Patent No.: US 8,337,923 B2
(45) Date of Patent: Dec. 25, 2012

(54) ENCAPSULATED ANTIMICROBIAL MATERIAL

(75) Inventors: Bob Coyne, Lenexa, KS (US); John Faragher, Richfield, WI (US); Sébastien Gouin, Århus (DK); Carsten Bjorn Hansen, Knebel (DK); Richard Ingram, Yeovil Somerset (GB); Torben Isak, Hinnerup (DK); Linda Valerie Thomas, Dorchester (GB); Kathryn Louise Tse, Københaven S (DK)

(73) Assignee: DuPont Nutrition Biosciences APS, Copenhagen K (DK)

( * ) Notice: Subject to any disclaimer, the term of this patent is extended or adjusted under 35 U.S.C. 154(b) by 1338 days.

(21) Appl. No.: 10/568,664

(22) PCT Filed: Aug. 6, 2004

(86) PCT No.: PCT/GB2004/003397
§ 371 (c)(1),
(2), (4) Date: Oct. 13, 2006

(87) PCT Pub. No.: WO2005/018322
PCT Pub. Date: Mar. 3, 2005

(65) Prior Publication Data
US 2007/0065547 A1    Mar. 22, 2007

Related U.S. Application Data

(63) Continuation-in-part of application No. 10/820,147, filed on Apr. 8, 2004, now abandoned.

(60) Provisional application No. 60/497,409, filed on Aug. 22, 2003, provisional application No. 60/533,053, filed on Dec. 30, 2003, provisional application No. 60/560,270, filed on Apr. 8, 2004.

(51) Int. Cl.
A23P 1/04    (2006.01)
A23L 1/48    (2006.01)

(52) U.S. Cl. .......................... 426/326; 426/98
(58) Field of Classification Search ............. 426/98, 426/326
See application file for complete search history.

(56) References Cited

U.S. PATENT DOCUMENTS

| 3,679,434 A | | 7/1972 | Bard et al. | |
|---|---|---|---|---|
| 5,032,404 A | | 7/1991 | Lopez-Berestein et al. | |
| 5,084,293 A | | 1/1992 | Todd, Jr. | |
| 5,139,787 A | | 8/1992 | Broderick et al. | |
| 5,204,029 A | | 4/1993 | Morgan et al. | |
| 5,472,684 A | | 12/1995 | Nabi et al. | |
| 5,516,543 A | * | 5/1996 | Amankonah et al. | 426/573 |
| 5,580,573 A | | 12/1996 | Kydonieus et al. | |
| 5,780,056 A | | 7/1998 | Akamatsu et al. | |
| 5,895,680 A | | 4/1999 | Cirigliano et al. | |
| 6,083,921 A | | 7/2000 | Xu | |
| 6,207,210 B1 | | 3/2001 | Bender et al. | |
| 6,312,741 B1 | * | 11/2001 | Navarro | 426/98 |
| 6,375,968 B1 | | 4/2002 | Quong | |
| 6,451,365 B1 | | 9/2002 | King et al. | |
| 6,673,756 B2 | | 1/2004 | Sonnenberg et al. | |
| 2002/0061954 A1 | | 5/2002 | Davis et al. | |
| 2003/0108648 A1 | | 6/2003 | Ming et al. | |
| 2004/0018284 A1 | | 1/2004 | Kuethe et al. | |
| 2005/0067726 A1 | | 3/2005 | Yan et al. | |

FOREIGN PATENT DOCUMENTS

| CH | 509 098 | 8/1971 |
|---|---|---|
| CN | 1334181 | 2/2002 |
| EP | 0 687 417 A1 | 12/1995 |
| EP | 0 770 336 A1 | 5/1997 |
| EP | 0 770 336 B1 | 7/1997 |
| EP | 1 369 045 A2 | 12/2003 |
| GB | 2 275 194 A | 8/1994 |
| GB | 2 388 581 A | 11/2003 |
| JP | 3-500051 | 12/1989 |
| JP | 2257866 | 10/1990 |
| JP | 7039355 | 2/1995 |
| JP | 7039356 A | 2/1995 |
| JP | 2001-299304 | 10/2000 |
| JP | 2001172159 | 6/2001 |
| RU | 2099087 | 12/1997 |
| RU | 2158587 | 11/2000 |
| WO | WO 87/01587 | 3/1987 |
| WO | WO 89/12399 | 12/1989 |
| WO | WO 91/14445 | 10/1991 |
| WO | WO 96/08248 | 3/1996 |
| WO | WO 97/47289 | 12/1997 |
| WO | WO 98/56395 | 12/1998 |
| WO | WO 00/30631 | 6/2000 |
| WO | WO 00/42987 | 7/2000 |
| WO | WO 01/22972 | 4/2001 |
| WO | WO 01/30326 | 5/2001 |
| WO | WO 02/055043 | 7/2002 |

(Continued)

OTHER PUBLICATIONS

Francis, Frederick J. 2000. Food Science and Technology 2nd edition, vol. 1. John Wiley & Sons, Inc., p. 68-69.*
Stecher, P. et al. 1968. The Merck Index, 8th edition. Merck & Co., Inc., Rahway, New Jersey. p. 971.*
Francis, F. J. 2000. Food Science and Technology, vol. 1, $2^{nd}$ edition. John Wiley & Sons, Inc., New York. p. 65.*
Karatzas et al., "Combined action of S-carvone and mild heat treatment on *Listeria monocytogenes* Scott A," *J. Applied Microbiology*, 89, 296-301 (2000).
Yang et al., "Synthesis of Variously Oxidized Abietane Diterpenes and Their Antibacterial Activities against MRSA and VRE," *Bioorganic & Medicinal Chemistry*, 9, 347-36 (2001).

(Continued)

*Primary Examiner* — Carolyn Paden
(74) *Attorney, Agent, or Firm* — Steptoe & Johnson LLP

(57) ABSTRACT

The present invention provides an antimicrobial material in an encapsulated form, comprising (i) a core comprising an antimicrobial material and (ii) a shell of encapsulating material, wherein the shell of encapsulating material is impermeable to the antimicrobial material. The invention further provides a process for introducing an antimicrobial material into a foodstuff comprising (i) providing the antimicrobial material in an encapsulated form comprising a core of antimicrobial material and shell of encapsulating material, and (ii) introducing encapsulated antimicrobial material into or onto the foodstuff.

45 Claims, 1 Drawing Sheet

FOREIGN PATENT DOCUMENTS

| WO | WO 02/069741 A1 | 9/2002 |
|---|---|---|
| WO | WO 02/094224 A1 | 11/2002 |
| WO | WO 2004/041251 A1 | 5/2004 |

OTHER PUBLICATIONS

Bicchi et al., "Determination of Phenolic Diterpene Antioxidants in Rosemary (Rosmarinus officinalis L.) with Different Methods of Extraction and Analysis," Phytochemical Analysis, 11, 236-242 (2000).

"Inactivation of nisin by alpha-chymotrypsin," The Journal of Dairy Science (1969) vol. 52: 9 pp. 1448-1450.

Alves, Virginia Farias, et al., "Bacteriocin exposure and food ingredients influence on growth and virulence of listeria monocytogenes in a model meat gravy system," Journal of Food Safety (2003) vol. 23 pp. 201-217.

Aureli, P., et al., "Antimicrobial activity of some plant essential oils against listeria monocytogenes," Journal of Food Protection (1992) vol. 55:5, pp. 344-348.

Backleh, M., et al., "Rapid quantitative enrichment of carnosic acid from rosemary (Rosmarinus officinalis L.) by isoelectric focused adsorptive bubble chromatography," Journal of Agricultural and Food Chemistry (2003) vol. 51:5, pp. 1297-1301 (Abstract only).

Basaga, Huveyda, et al., "Antioxidative and free radical scavenging properties of rosemary extract," Academic Press Limited (1997) pp. 105-108.

Bell, P. G., et al., "The efficacy of nisin, sorbic acid and monolaurin as preservatives in pasteurized cured meat products," Food Microbiology (1987) vol. 4 pp. 277-283.

Belmont, Jonathan, et al., "Pimaricin: Corneal Penetration via a liposome vehicle," Francis I Procotor Foundation, University of California, San Francisco (abstract only).

Benech R.-O., et al., "Inhibition of listeria innocua in cheddar cheese by addition of nisin z in liposomes or by in situ production in mixed culture," Applied and Enviromental Microbiology (2002) pp. 3683-3690.

Beuchat, L.R., "Antimicrobial Properties of Spices and Their Essential Oils," Natural Antimicrobial Systems and Food Presentation VM Dillout and RC Rervd. CAB International (1994) pp. 167-179.

Bower C. K., et al., "Suppression of listeria monocytogenes colonization following adsorption of nisin onto silica surfaces," Applied and Envirnomental Microbiology (1995) vol. 61:3, pp. 992-997.

Bower, C. K., et al., "Influences on the antimicrobial activity of surface-adsorbed nisin," Journal of Industrial Microbiology (1995) vol. 15 pp. 227-233.

Cahill, S. M., et al., "Bioengcapsulation Technology in Meat Preservation," Applied Microbiology (2001) pp. 239-266.

Calucci, L., et al., "Effects of gamma-irradiation on the free redical and antioxidant contents in nine aromatic herbs and spices," Journal of Argicultural and Food Chemistry (2003) vol. 51:4 pp. 927-934 (abstract only).

Campell, W., et al., "The impact of fortification with conjugated linoleic acid (CLA) on the quality of fluid milk," Journal of Dairy Science (2003) vol. 86:1 pp. 43-51 (abstract only).

Casterio, G., et al., "Research on the use of nisin in charcuterie products," Industrie Alimentari (1979) pp. 1-12.

Clark, J. Peter, "Food encapsulation: capturing one substance by another," Products & Technologies (2002) vol. 56:11 pp. 63-65.

Collins, M.A., et al., "Antimicrobial activity of carnosol and ursolic acid: two anti-oxidant constituents of Rosmarinus officinalis L.," Food Microbiology (1987) vol. 4, pp. 311-315.

Cutter, C.N., et al., "Incorporation of nisin into a meat binding system to inhibit bacteria on beef surfaces," Letters in Applied Microbiology (1998) vol. 27 pp. 19-23.

Cutter, C.N., et al., "Growth of brochothrix thermosphacta in growth beef following immobilization of nisin in calcium alginate gels," Letters in Applied Microbiology (1996) vol. 23 pp. 9-12.

Cutter, C.N., et al., "Reduction of brochothrix thermosphacta on beef surfaces following treatments with nisin in calcium alginate gels," Food Microbiology (1997) vol. 14 pp. 425-430.

Cuvelier, Marie-Elisabeth, et al., "Antioxidative activity and phenolic composition of pilot-plant and commercial extracts of sage and rosemary," JAOCS (1996) vol. 73:5, pp. 645-650.

Daeschel, Mark A., et al., "Antimicrobial activity of nisin adsorbed to Hydrophilic and Hydrophobic Silicon Surfaces," Journal of Food Protection (1992) vol. 55:9, pp. 731-735.

Degnam, Alan J., et al., "Influence of beef tallow and mucle on the antilisterial activity of pediocin AcH and liposome-encapsulated pediocin AcH," Journal of Food Protection (1992) vol. 55:7 pp. 552-554.

Degnan, Alan J., et al., "Antilisterial acyivity of pediocin AcH in model food systems in the presence of an emulsifier or encapsulated within liposomes," International Journal of Food Microbiology (1993) vol. 18 pp. 127-138.

Dougherty, Joel, et al., "Chronic blepharitis: new perspectives," University of Texas Health Science Center at Dallas, Texas (abstract only).

Del Campo, Jose, et al., "Antimicrobial effect of rosemary extract," Journal of Food Protection (2000) vol. 63:10, pp. 1359-1368.

Dufour, M., et al., "Development of a method to quantify in vitro the synergistic activity of 'natural' antimicrobials," International Journal of Food Microbiology (2000) vol. 85 pp. 249-258.

Eiserle, Robert J., "A natural flavoring and stabilization system for food," Food Product Development (1971) pp. 70-71.

Ettayebi, Khalil, et al., "Synergistic effects of nisin and thymol on antimicrobial activities in listeria monocytogenes and bacillus subtilis," FEMS Microbiology Letters (2000) vol. 183, pp. 191-195.

Farbood, M. I., et al., "Effect of rosemary spice extractive on growth of microorganisms in meats," J. Milk Food Technol. (1976) vol. 39: 10, pp. 675-679.

Fang, Tony J, et al., "Growth patterns of Escherichia coli O157:H7 in ground beef treated with nisin, chelators, organic acids and their combinations immobiled in calcium alginate gels," Food Micrbiology (2003) vol. 20 pp. 243-253.

Frankel, Edwin N., et al., "Antioxidant activity of a rosemary extract and its constituents, carnosic acid, carnosol, and rosmarinic acid in bulk oil and oil-in-water emulsion," J. Ahric. Food Chem. (1996) vol. 44, pp. 131-135.

Franklin, S. T., et al., "Consumer evaluation of "high-CLA dairy products," produced from cows fed fish oil" University of Kentucky, Lexington, KY (abstract only).

Gallagher, GA, et al., "Develop on-line verification and intervention procedures for HACCP in slaughter/processing systems," Food Safety Progress Report (2002).

Gola, Jiri, "Preservation of canned hams stored at unusual temperatures," Science and Research in the Food Industry (1962) vol. 10, pp. 239-244.

Imm, J. Y., et al., "Control of acidification of yogurt by microencapsulated bacteriocin," Korean Food Research Institute, Korea Yakult Co., Ltd., Korea University (abstract only).

Izco, Jesus M., et al., "Use of Capillary Electrophoresis (CE) to determine metabolic organic acids in milk," Dairy Products Technology Center, Cal. Poly. (abstract only).

Jaben, Scott L., et al., "Intraocular miconazole therapy in fungal endopithalmitis," Department of Ophthalmology, Bascom Palmor Eye Institute, University of Miami School of Medicine (abstract only).

Jung, Dong-Sun, et al., "Influence of fat and emulsifiers on the efficacy of nisin in inhibiting listeria monocytogenes in fluid milk," J. Dairy Science (1992) vol. 75, pp. 387-393.

Kabara, Jon J., "Medium-Chain Fatty Acids and Esters," Antimisobials in Food Eats PM Davidson & Albranen, Edt. Marcel Dekker (1993) pp. 307-342.

Kabara, Jon J., et al., "A new preservative system for food," Journal of Food Safety (1982) vol. 4 pp. 13-25.

Kane, Anne, et al., "Intravitreal Injection of Gentamicin in Rabbits," New England Medical Center Hospital and Tufts University School of Medicine, Boston (abstract only).

Krasaekoopt, Wunwisa, et al., "Evaluation of encapsulation techniques of probiotics for yoghurt," International Daily Journal (2003) vol. 13:1 pp. 3-13.

Lante, A., et al. "Nisin released from immobilization matrices as antimicrobial agent," Biotechnology Letters (1994) vol. 16:3 pp. 293-298.

Lante, Anna, et al., "Il controllo di clostridi di interesse caseario con nisina immobilizzata in membrance semiperrneabili," *Industrie Alimentari* (2000) pp. 589-594.

Laridi, R., et al., "Liposome encapsulated nisin Z: Optimization, stability and release during milk fermentation," *International Dairy Journal* (2003) vol. 13 pp. 325-336.

Lipstock, Kenneth, et al., "Toxicity of intravitral rifampin," Medical College of Virginia-Virginia Commonwealth University (abstract only).

Mac Neil, J. H., et al. "Use of chemical compounds and a rosemary spice extract in quality maintenance of deboned poultry meat," *Journal of Food Science* (1973) vol. 38 pp. 1080-1081.

MacNeil, Joseph H., "Frankfurters without nitrates or nitrites," *Food Product Development* pp. 37-40.

Moujir, Laila, et al., "Structure-antimicrobial activity relationships of abietane diterpenes from salvia species," *Phytochemistry* (1993) vol. 34:6, pp. 1493-1495.

Munne-Bosch, Sergi, et al. "Subcellular Compartmentation of the diterpene carnosic acid and its dervatives in the leaves of rosemary," *Plant Physiol.* (2001) vol. 125:2, pp. 1094-1102.

Munne-Bosch, Sergi, et al., "The formation of phenolic diterpenes in *Rosmarinus officinalis* L. under Mediterranean climate," *Eur Food Res Technol* (2000) vol. 210, pp. 263-267.

Nychas, G.J.E., "Natural antimicrobials from plants," *New Methods of Food Presentation* (1995) pp. 58-89.

Olasupo, N.A., et al., "Activity of natural antimicrobial compounds against *Escherichia coli* and salmonella enterica serovar typhimurium," *Letters in Applied Microbiology* (2003) vol. 36, pp. 448-451.

Pandit, V.A., et al., "Sensitivity of listeria monocytogenes to rosemary (*Rosmarinus officinalis* L.)," *Food Microbiology* (1994) vol. 11, pp. 57-63.

Parmar, V. S., et al., "Synthesis, antimicrobial and antiviral activities of novel polyphenolic compounds," *Indian Journal of Chemistry* (1996) vol. 35B p. 220-232.

Periago, P.M., et al., "Combined effect of nisin, carvacrol and thymol on the viability of Bacillus cereus heat-treated vegetative cells," *Food Science and Techology International* (2001) vol. 7:6, pp. 487-492.

Periago, Paula M., et al., "Combined effect of nisin and carvacrol at different pH and temperature levels on the viability of different strains of bacillus cereus," *International Journal of Food Microbiology* (2001) vol. 68, pp. 141-148.

Pol, I. E., et al., "Combined action of nisin and carvacrol on bacillus cereus and listeria monocytogenes," *Letters in Applied Microbiology* (1999) vol. 29, pp. 166-170.

Pol, Irene E., et al., "Bioengetic consequences of nisin combined with carvacrol torwards bacillus cereus," *Innovative Food Science & Emerging Technologies* (2002) vol. 3, pp. 55-61.

Powell, J., et al., "Sensory and analytical analysis of milk formulutions with sweet cream buttermilk," Virginia Polytechnic Institute and State University (abstract only).

Quirin, K.W., "SFE of natural antioxidants from rosemary and sage," *Innovations in Food Technology* (2003) vol. 81 pp. 31-33 (abstract only).

Richard, Jean A., "Use of bacteriocin producong starters advantageously in dairy industry," *INRA*, Dairy Research Unit.

Rose, N. L., et al., "Inactivation of nisin by glutathione in fresh meat," *Journal of Food Science* (1999) vol. 64:5 pp. 759-762.

Rose, N. L., et al., "Nisin: A novel substrate for glutathione s-transferase isolated from fresh beef," *Journal of Food Science* (2002) vol. 67 pp. 2288-2293.

Sagdic, O., et al., "Antibacterial activity of Turkish spice hydrosols," Food Source Control (2003) vol. 14:3, pp. 141-143 (abstract only).

Salim, A., et al., "A simple procedure for reducing lead content in fish," *Food and Chemical Toxicology* (2003) vol. 41, pp. 595-597.

Schlyter, Jimmy H., et al., "The effects of diacetate with nitrite, lactate, or pediocin on the viability of listeria monocytogenes in turkey slurries," *International Journal of Food Microbiology* (1993) vol. 19 pp. 271-281.

Serra, Bonvehi, J., et al., "Flavour index and aroma profiles of fresh and processed honeys," *Journal of the Science of Food and Agriculature* (2003) vol. 83:4, pp. 275-282.

Shahidi, Fereidoon, et al., "Encapsulation of food ingredients," *Critical Reviews in Food and Science and Nutrition* (1993) vol. 33:6, pp. 501-547.

Sidikaro, Joseph, et al., "Concentration of gentamicin in preocular tear film following topical application," Cullen Eye Institute, Baylor College of Medicine, Houston, Texas (abstract only).

Spillane, S. M., et al., "Antimicrobial effect on nisin-containing microspheres," *Proceed. Int'l. Symp. Control. Rel. Bioact. Mater.* (2000) vol. 27 p. 1373-1374.

Talcott, S.T., et al., "Phytochemical stability and color retention of copigmented and processed muscadine grape juice," *Journal of Agriculature and Food Chemistry* (2003) vol. 51:4, pp. 957-963.

Thaludom, S., et al., "Rheological properties of primary stabilizer/milk protien/rcarrageenan/sucrose systems simulating ice cream mix," University of Guelph, Guelph, ON, Canada (abstract only).

Taylor, Steve L., et al., "Evaluation of the antibotulinal effectiveness of nisin in bacon," *Journal of Food Protection* (1985) vol. 48:11 pp. 949-952.

Thomas, L. V., et al., "Synergist effect of sucrose fatty acid esters on nisin inhibition of gram-positive bacteria," *Journal of Applied Microbiology* (1998) vol. 85, pp. 1013-1022.

Usborne, W. R., et al., "Sensory evaluation of nisin-treated bacon," *Canadian Institute of Food Science and Technology* (1986) vol. 19:1 pp. 38-40.

Valero, M., et al., "Antibacterial activity of 11 essential oils against *Bacillus cereus* in tydnallized carrot broth," *Internal Journal of Food Microbiology* (2003) vol. 85, pp. 73-81.

Walker, J.R.L. "Antimicrobial compounds in food plants," *Department of Plant and Microbial Sciences*, University of Canterbury pp. 181-200.

Wan, J., et al., "Incorporation of nisin in micro-particles of calcium alginate," *Letters in Applied Microbiology* (1997) vol. 24 pp. 153-158.

Wan. J., et al., "Continuous production of bacteriocins, brevicin, nisin and pediocin, using calcium alginate-immobilzed bacteria," *Journal of Applied Bacteriology* (1995) vol. 79 pp. 671-676.

Were, Lilian M, et al., "Encapsulation of nisin and lysozyme in liposomes enhances efficacy against listeria monocytogenes," *Journal of Food Protection* vol. 67, (2004) pp. 922-927.

Zaika, Laura L., "Spices and herbs:their antimicrobial activity and its determination," *Journal of Food and Safety* (1988) vol. 9, pp. 97-118.

\* cited by examiner

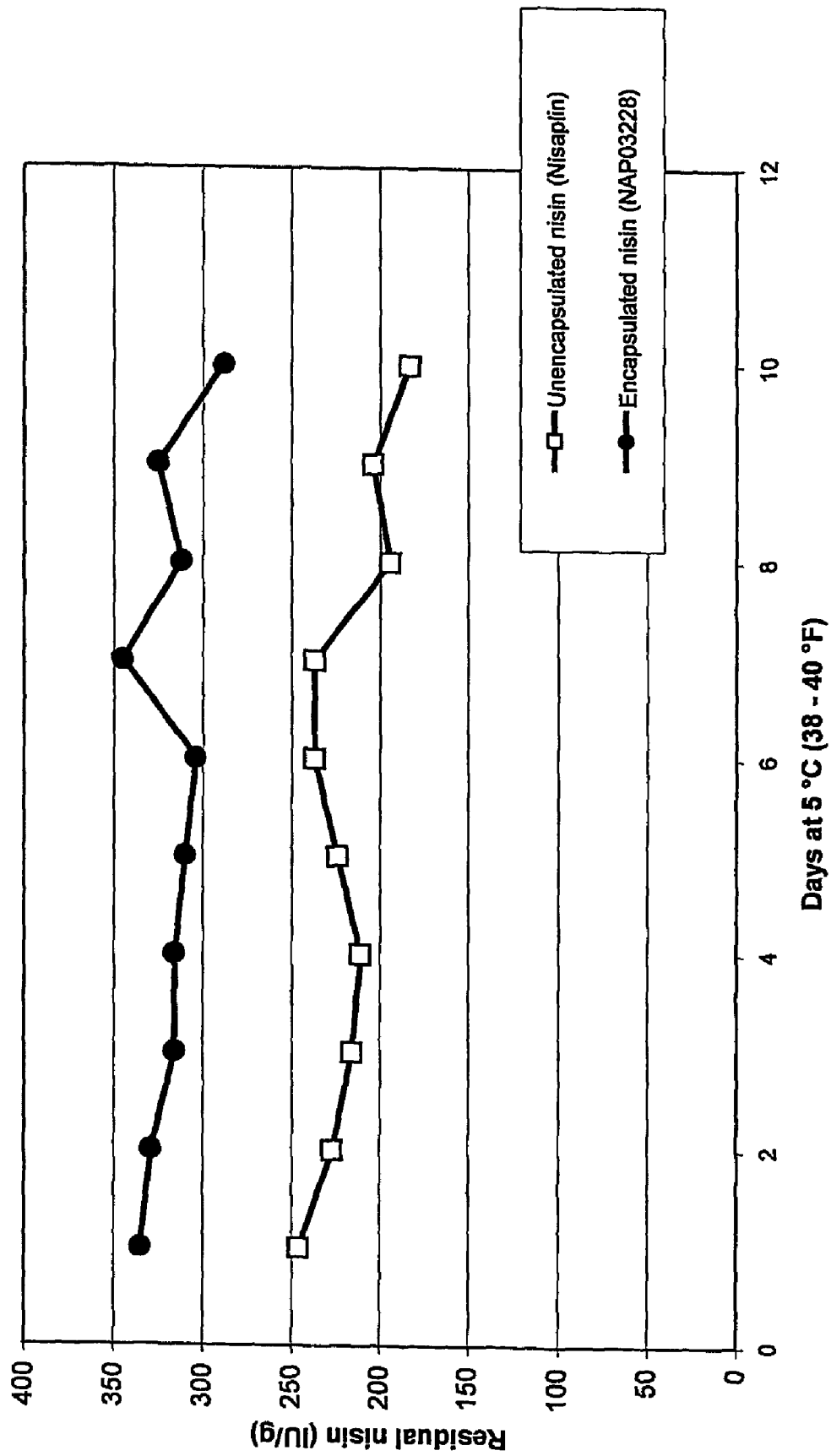

ENCAPSULATED ANTIMICROBIAL MATERIAL

CLAIM OF PRIORITY

This application claims priority under 35 USC 371 to International Application No. PCT/GB2004/003397, filed on Aug. 6, 2004, which claims priority to British Patent Application No. 0319817.3, filed on Aug. 22, 2003, U.S. Provisional Application Ser. No. 60/497,409, filed Aug. 22, 2003, British Patent Application No. 0323335.0, filed Oct. 6, 2003, U.S. Provisional Patent Application Ser. No. 60/533,053, filed Dec. 30, 2003, U.S. Provisional Patent Application Ser. No. 60/560,270, filed Apr. 8, 2004 and U.S. Utility patent application Ser. No. 10/820,147, filed Apr. 8, 2004, each of which is incorporated by reference in its entirety.

The present invention relates to a process for introducing an antimicrobial material into a foodstuff. The present invention further relates to an antimicrobial material.

BACKGROUND

Antimicrobial materials are well known in the art. A well known antimicrobial material is natamycin. Natamycin is a polyene macrolide natural antifungal agent produced by fermentation of the bacterium *Streptomyces natalensis*. Natamycin (previously known as pimaricin) has an extremely effective and selective mode of action against a very broad spectrum of common food spoilage yeasts and moulds with most strains being inhibited by concentrations of 1-15 ppm of natamycin.

Natamycin is accepted as a food preservative and used world wide, particularly for surface treatment of cheese and dried fermented sausages. It has several advantages as a food preservative, including broad activity spectrum, efficacy at low concentrations, lack of resistance, and activity over a wide pH range. Neutral aqueous suspensions of natamycin are quite stable, but natamycin has poor stability in acid or alkaline conditions, in the presence of light, oxidants and heavy metals. For example, natamycin can be used in pasteurised fruit juice to prevent spoilage by heat-resistant moulds such as *Byssochlamys*. The acid pH of the juice, however, promotes degradation of natamycin during pasteurisation as well as during storage if the juice is not refrigerated. Natamycin is also degraded by high temperature heat processing, such as occurs during cooking of bakery items in an oven.

At extreme pH conditions, such as pH less than 4 and greater than 10, natamycin is rapidly inactivated with formation of various kinds of decomposition products. Acid hydrolysis of natamycin liberates the inactive aminosugar mycosamine. Further degradation reactions result in formation of dimers with a triene rather than a tetraene group. Heating at low pH may also result in decarboxylation of the aglycone. Alkaline hydrolysis results in saponification of the lactone. Both acid degradation products (aponatamycin, the aglycone dimer, and mycosamine), and alkaline or UV degradation products proved even safer than natamycin in toxicology tests, but are inactive biologically.

Natamycin is generally dosed into or onto food as a powder or as an aqueous natamycin suspension. This kind of dosage form leaves the natamycin unprotected under the conditions of processing and use. The natamycin powder, although mixed with excipients such as lactose, may also be sticky to handle and cause dust problems within the food processing plants. Furthermore, natamycin is so highly effective as an antifungal compound that it may adversely affect the processing of the products that it is intended to preserve if this is dependent on desired fungal activity. There is thus a need for a protected dosage form of natamycin.

A general description of natamycin and its current uses may be found in Thomas, L. V. and Delves-Broughton, J. 2003. Natamycin. In: Encyclopedia of Food Sciences and Nutrition. Eds. B. Caballero, L. Trugo and P. Finglas, pp 4109-4115. Elsevier Science Ltd.

Bacteriocins are antimicrobial proteins or peptides that can be produced by certain bacteria, which can kill or inhibit the growth of closely related bacteria. The bacteriocins produced by lactic acid bacteria are of particular importance since they have great potential for the preservation of food and for the control of foodborne pathogens. (Wessels et al. 1998.)

The most well known bacteriocin is nisin, which is the only bacteriocin currently authorised as a food additive. Nisin is produced by fermentation of the dairy starter culture bacterium *Lactococcus lactis* subsp. *lactis*, and is sold as the commercial extract Nisaplin® Natural Antimicrobial (Danisco). Nisin has an unusually broad antimicrobial spectrum for a bacteriocin, being active against most Gram-positive bacteria (e.g. species of *Bacillus, Clostridium, Listeria*, lactic acid bacteria). It is not normally effective against Gram-negative bacteria, yeasts or moulds. Nisin is allowed as a food preservative worldwide but its levels of use and approved food applications are strictly regulated, varying from country to country.

Other bacteriocins have since been discovered with potential as food preservatives, e.g. pediocin, lacticin, sakacin, lactococcin, enterococin, plantaricin, leucocin. These are also active, although usually with a more narrow spectrum, against Gram-positive bacteria. Their food use is at present restricted to production of the bacteriocin in situ, i.e. by growth of the producer organism within the food.

Food safety and prevention of food spoilage is an ever present concern worldwide, particularly with the increasing trend for convenience foods such as ready to eat meals, soups, sauces or snacks. Spoilage of food is a major economic problem for the food manufacturer. Food manufacturers need to protect the health and safety of the public by delivering products that are safe to eat. Such food must have a guaranteed shelf life, either at chilled or ambient temperature storage. Consumers prefer good tasting food of high quality—this is difficult to achieve with chemical preservatives, harsh heating regimes and other processing measures. Food safety and protection is best achieved with a multiple preservation system using a combined approach of milder processing and natural preservatives. Foodborne micro-organisms are also less able to adapt and grow in food preserved with different preservative measures.

There is much concern about food safety and the growth of food pathogens such as *Listeria monocytogenes*. This particular pathogen can grow at low temperatures, which are often used as an additional preservative measure. Foodborne pathogens can sometimes adapt to different preservatives and storage conditions, thus a combination of preservative measures can be more successful than individual measures.

Cooked meat joints are new generation, convenience products now on offer to consumers. The preparation of these meat joints usually involves injection or tumbling of the raw meat in polyphosphate brine to increase the meat's tenderness, moistness and volume. The meat is then cooked before distribution to retail outlets and its subsequent consumer purchase and consumption.

The majority of processes for these meats now involve the 'cook-in' system in which the meat is cooked in plastic bags or film. Whole joints may be de-boned, pumped with polyphosphate brine and tumbled or massaged for a short period. This distributes the brine evenly and also achieves a layer of exudate on the surface that helps the plastic packaging to adhere closely to the meat surface. Large joints are usually gas or vacuum-packaged into plastic bags. These cooked meat products are often considered to be of good quality and healthy, since they may be low in fat with minimal salt content. They may not necessarily be re-heated by the purchaser prior to consumption.

These minimally processed products rely on refrigeration to ensure stability and safety of the cooked meat during shelf life, which may be as long as 90 days (Varnam and Sutherland, 1995). Spoilage of the cooked meats, if post-processing contamination is not a factor, would be due to the Gram-positive heat-resistant bacteria *Bacillus* and *Clostridium*, particularly if the meat is exposed to temperatures above 7° C. Spoilage due to these organisms can be rapid if the meat is exposed to temperatures as high as 15° C. or above. If the meat has not been sufficiently cooked, *Enterococcus* or heat-resistant *Lactobacillus* species may survive, many of which can grow at refrigeration temperatures. If the product has been handled after cooking then re-packaged and vacuum-packed, spoilage is often associated with *Lactobacillus, Leuconostoc* or *Carnobacterium*. *Brochothrix thermosphacta*, another Gram-positive bacterium, can also cause problems. Gram-negative bacteria will only be a problem in unpackaged cooked meats, or those that are packed in air-permeable film. Moulds may develop on cooked meat joints that have been exposed to air and whose surfaces have dried out. There is also concern over post-processing contamination and growth of *Listeria monocytogenes*, a foodborne pathogen that can grow at refrigeration temperatures. It would be a benefit to both the public in terms of safety and manufacturers in terms of economics and reputation, if an effective preservative could be somehow applied to the surface layer of the cooked meat.

Raw, whole muscle meat is also being increasingly sold as a chilled convenience meat product that is ready prepared and tenderised for the consumer to cook. The meat is usually covered with a marinade then vacuum-packed in a clear pouch. The marinade may be applied and simply left to soak into the meat surface, or the meat may be tumbled in the marinade to increase its tenderising effect and penetration. This vacuum-packed, marinated fresh meat can be kept for up to 28 days at refrigeration temperatures before purchase by the consumer and subsequent cooking at home. These meat products are considered value-added fresh meats and cover a wide range of raw meats (pork, chicken, beef, ground beef, steaks, diced meats, joints, etc.). The combination of the acidic nature of the marinade and the lack of oxygen in the vacuum-packed pouches means that Gram-positive lactic acid bacteria are associated with spoilage of these products (Susiluoto et al. 2003).

Nisin is a natural preservative that has been used safely in food for nearly 50 years. It is effective against Gram-positive bacteria including lactic acid bacteria, *Brochothrix thermosphacta, Listeria monocytogenes, Bacillus* and *Clostridium*. As the spoilage associated with both the meat products described above, is usually caused by Gram-positive bacteria, nisin could be considered as part of a preservative system to guarantee or extend shelf life. However the environment of both meat products is not favourable to nisin stability or activity. Brine and polyphosphate solutions used to inject raw meat are usually at alkaline pH. Nisin stability is optimum at pH 3 (Davies et al. 1998). The cooking process, particularly at high or neutral pH conditions, would lead to significant nisin degradation. In raw meat, nisin is vulnerable to degradation by proteases. A more specific concern is the inactivation of nisin in raw meat by the formation of an adduct with glutathione in an enzyme-mediated reaction (Rose et al. 1999, 2002, 2003).

Numerous prior art teachings have discussed potential uses of nisin in foodstuffs. Examples are:

Caserio et al. (1979) describes research on the use of nisin in cooked, cured meat products. Mortadella, wurstel sausage, prosciutto. The target organisms: *Staphylococcus*, sulphate-reducing clostridia. Prosciutto had nisin injected with brine after dissolution in dilute lactic acid.

Gola (1962) incorporated nisin into the gelatine for canning of large hams. In the first experiment, brines for injection were acidified to facilitate nisin solubility.

Taylor & Somers (1985) evaluate the antibotulinal effectiveness of nisin in bacon. Nisin was included in brine formulation injected into pork belly.

Usborne et al. (1986) discusses sensory evaluation of nisin-treated bacon. Nisin was added to brine pumping solution before injection into the bacon.

US 2003/0108648 relates to compositions having bacteriostatic and bactericidal activity against bacterial spores and vegetative cells and process for treating foods therewith.

U.S. Pat. No. 6,207,210 relates to broad-range antibacterial composition and process of applying to food surfaces EP0770336 describes injection of meat trimmings/brine solution in which a starter culture has produced a bacteriocin.

Article found at http://www.nai.usda.gov/fsrio/ppd/ars010f.htm on work at Meat Research Unit, MARC mentions a presentation on 'antibacterial properties of injectable beef marinades'.

WO2003/11058 relates to food preservation formulation comprising compound(s) derived from natural sources. Natural compounds are formulated and application to a food and irradiation at <3 kGy results in decrease of microflora compared to non-irradiated controls. Nisin is a preferred compound.

US 2003/0108648 teaches nisin as part of a combination for marinades

The above extensive prior art does not address or solve the problems of protection of antimicrobial materials such as nisin from environments, such as those in meat products, which are not favourable to the stability or activity of the antimicrobial material The present invention alleviates the problems of the prior art.

In one aspect the present invention provides an antimicrobial material in an encapsulated form, comprising a core of antimicrobial material and shell of encapsulating material, wherein the shell of encapsulating material is impermeable to the antimicrobial material and is optionally physiologically acceptable.

The term "encapsulated" is well known in the art. Encapsulation can be defined as the technology of packaging a substrate (solids, liquids, gases) within another material. In the encapsulate the material which has been entrapped is termed the core material or the internal phase while the encapsulating material is referred to as the coating, the shell material or the carrier. Such encapsulated materials are also commonly referred to as core/shell materials.

In one aspect the present invention provides a process for producing of an antimicrobial material in an encapsulated form, comprising co-processing an antimicrobial material with an encapsulating material, to cause said material to encapsulate said antimicrobial material within a shell, and recovering the antimicrobial material, wherein the shell of encapsulating material is impermeable to the antimicrobial material and is optionally physiologically acceptable.

In one aspect the present invention provides a process for introducing an antimicrobial material into a foodstuff comprising (i) providing the antimicrobial material in an encapsulated form comprising a core of antimicrobial material and shell of encapsulating material, (ii) introducing encapsulated antimicrobial material into or onto the foodstuff, preferably by (a) injecting the encapsulated antimicrobial material into the foodstuff or (b) tumbling the encapsulated antimicrobial material with the foodstuff.

In one aspect the present invention provides a foodstuff prepared by a process for introducing an antimicrobial material into a foodstuff comprising (i) providing the antimicrobial material in an encapsulated form comprising a core of antimicrobial material and shell of encapsulating material, (ii) introducing encapsulated antimicrobial material into or onto the foodstuff, preferably by (a) injecting the encapsulated antimicrobial material into the foodstuff or (b) tumbling the encapsulated antimicrobial material with the foodstuff.

In one aspect the present invention provides a foodstuff obtainable by a process for introducing an antimicrobial material into a foodstuff comprising (i) providing the antimicrobial material in an encapsulated form comprising a core of antimicrobial material and shell of encapsulating material, (ii) introducing encapsulated antimicrobial material into or onto the foodstuff, preferably by (a) injecting the encapsulated antimicrobial material into the foodstuff or (b) tumbling the encapsulated antimicrobial material with the foodstuff.

SUMMARY OF THE INVENTION

Aspects of the invention are defined in the appended claims.

We have found that by providing the present antimicrobial materials in an encapsulated form the materials may be protected from environments, such as those in meat products, which are not favourable to the stability or activity of the antimicrobial material. Moreover, by injecting the encapsulated antimicrobial material into the foodstuff or tumbling the encapsulated antimicrobial material with the foodstuff, the encapsulated antimicrobial material may be effectively introduced into or onto the foodstuff. We have found the injection particularly advantageous and surprising. Prior art processes have directly injected non-encapsulated antimicrobial materials such as nisin into food products. We have found that a "shell" may be provided on the antimicrobial material which is capable of withstanding the demanding physical forces exerted on the encapsulated antimicrobial material during injection. In particular injection exerts high pressures and yield stress on the material to be injected. We have also found that a "shell" may be provided on the antimicrobial material which is capable of protecting the antimicrobial material from adverse conditions and/or allows sustained/controlled release.

The present invention provides a process for delivering an antimicrobial material and an anti-microbial material per se which is resistant to unwanted degradation and which may be released to provide a long term antimicrobial effect.

For ease of reference, these and further aspects of the present invention are now discussed under appropriate section headings. However, the teachings under each section are not necessarily limited to each particular section.

BRIEF DESCRIPTION OF THE DRAWINGS

FIG. 1 shows the effect of encapsulated nisin in hot dogs

DETAILED DESCRIPTION OF THE INVENTION

Preferred Aspects
Antimicrobial Material

In one preferred aspect the antimicrobial material is an antibacterial material.

In one preferred aspect the antimicrobial material is a bacteriocin.

The antimicrobial material, such as a bacteriocin, may typically be selected from materials (bacteriocins) that can be used as preservatives in food Preferably the antimicrobial material is selected from lanthionine containing bacteriocins, *Lactococcus*-derived bacteriocins, *Streptococcus*-derived bacteriocins, *Pediococcus*-derived bacteriocins, *Lactobacillus*-derived bacteriocins, *Carnobacterium*-derived bacteriocins, *Leuconostoc*-derived bacteriocins, *Enterococcus*-derived bacteriocins and mixtures thereof.

Preferably the antimicrobial material is at least nisin.
Preferably the antimicrobial material consists of nisin.

Nisin is a lanthionine-containing bacteriocin (U.S. Pat. No. 5,691,301) derived from *Lactococcus lactis* subsp. *lactis* (formerly known as *Streptococcus-lactis*) (U.S. Pat. No. 5,573, 801). In a preferred aspect of the present invention the bacteriocin used in the present invention is at least nisin.

As discussed in U.S. Pat. No. 5,573,801 nisin is a polypeptide bacteriocin produced by the lactic acid bacteria, *Lactococcus lactis* subsp. *lactis* (formerly known as *Streptococcus lactis* Group N).

Nisin is reportedly a collective name representing several closely related substances which have been designated nisin compounds A, B, C, D and E (De Vuyst, L. and Vandamme, E. J. 1994. Nisin, a lantibiotic produced by *Lactococcus lactis* subsp. *lactis*: properties, biosynthesis, fermentation and applications. In: Bacteriocins of lactic acid bacteria. Microbiology, Genetics and Applications. Eds.: De Vuyst and Vandamme. Blackie Academic and Professional, London). The structure and properties of nisin are also discussed in the article by E. Lipinska, entitled "Nisin and Its Applications", The 25th Proceedings of the Easter School in Agriculture Science at the University of Nottingham, 1976, pp. 103-130 (1977), which article is hereby incorporated by reference. In 1969 the FAO/WHO Joint Expert Committee on Food Additives set specifications for the purity and identity of nisin (FAO/WHO Joint Expert Committee on Food Additives. 1969. Specifications for identity and purity of some antibiotics. 12$^{th}$ Report. WHO Technical Report Series No. 430). This committee recognised nisin as a safe and legal preservative based on extensive toxicological testing. Nisin has the food additive number E234 and is classed as GRAS (Generally Recognised As Safe) (Food and Drug Administration. 1988. Nisin preparation: Affirmation of GRAS status as a direct human ingredient. Federal Regulations 53: 11247). The international activity unit (IU hereinafter) was defined as 0.001 mg of an international nisin reference preparation. Nisaplin® Natural Antimicrobial is the brand name for a nisin concentrate containing 1 million IU per g, which is commercially available from Danisco.

Nisin is an acknowledged and accepted food preservative with a long history of safe, effective food use. There have been several reviews of nisin, e.g. Hurst 1981; 1983; Delves-Broughton, 1990; De Vuyst and Vandamme, 1994; Thomas et al. 2000; Thomas & Delves-Broughton, 2001). Nisin was discovered over 50 years ago and the first commercial preparation, made in 1953, was Nisaplin®. Nisin has several characteristics that make it particularly suitable as a food preservative. It has undergone extensive toxicological testing to demonstrate its safety. It is heat-stable, acid-stable and effective against a broad spectrum of Gram-positive bacteria. It is not normally effective against Gram-negative bacteria, yeasts or moulds but activity against Gram-negative bacteria and yeasts has been reported in the presence of chelating agents (PCT/US 8902625. WO 89/12399). Nisin is an effective preservative in pasteurised and heat-treated foods (e.g. processed cheese, cheese, pasteurised milks, dairy desserts, cream, mascarpone and other dairy products, puddings such as semolina, tapioca etc., pasteurised liquid egg, pasteurised potato products, soy products, crumpets, pikelets, flapjacks, processed meat products, beverages, soups, sauces, ready to eat meals, canned foods, vegetable drinks) and low acid foods such as salad dressings, sauces, mayonnaise, beer, wine and other beverages.

Although some loss of activity may be expected when used with processed foods, this may be ameliorated e.g. by increasing the amount of nisin applied. Effective levels of nisin to preserve foodstuffs reportedly range from 25-500 IU/g or more. Other effective levels would be appreciated by one skilled in the art. For example levels of 50-400 IU/g may be utilised.

Since the discovery of the first bacteriocin, nisin, many other bacteriocins have now been found (Hoover, 1993; Ray & Daeschel, 1994; Axelsen, 1998; Naidu, 2000; Ray et al. 2001; Ray & Miller, 2003). The bacteriocin pediocin, produced by *Pediococcus pentosaceus, P. acidilactici*, or *Lactobacillus plantarum*, may be used in the present invention. Like nisin, different structures of pediocin have been described. At present pediocin and other bacteriocins are not allowed as food additives but their antibacterial activity can be achieved by production of the bacteriocin in situ, as a consequence of the growth of the producer organism in the food. This is the purpose of commercial protective cultures such as HOLDBAC™ *Listeria* (Danisco). Pediocin has a more narrow antimicrobial spectrum compared to nisin, but there is much interest in its food safety ability to kill, prevent or control the growth of the food pathogen *Listeria monocytogenes*(Ray & Miller, 2000). Other bacteriocins may be used in the present invention, including those named generally as divercin, leucocin, mesentericin, sakacin, curvacin, bavaricin, acidocin, bifidocin, carnobacteriocin, pisicocin, piscicolin, mundticin, enterocin, thermophilin, lacticin, plantaricin, lactococcin, divercin, diplococcin, mesenterocin, leuconosin, carnosin, acidophilin, lactacin, brevicin, lactocin, helevticin, reutericin, propionicin.

Preferably the antimicrobial material is at least natamycin.

Preferably the antimicrobial material consists of natamycin.

Microorganism

As discussed herein the present invention may prevent and/or inhibit the growth of, and/or kill a micro-organism in a material. This may be slowing or arresting a micro-organism, such a bacteria, or by killing the micro-organism present on contact with the present composition.

In one aspect the antimicrobial material is present in an amount to provide a microbicidal or microbiostatic effect.

In one aspect the bacteriocin and the extract are present in an amount to provide a microbicidal or microbiostatic effect.

In a highly preferred aspect the microbicidal or microbiostatic effect is a fungicidal or fungistatic effect, optionally including effect against yeasts.

In a preferred aspect the fungicidal or fungistatic effect is in respect of an organism selected from fungi or yeasts associated with food spoilage or food borne disease.

In a preferred aspect the fungicidal or fungistatic effect is in respect of an organism selected from Yeasts: species of *Candida* (e.g. *C. krusei, C. parapsilosis, C. utilis, C. valida*), *Dekkera* (e.g. *D. bruxellensis*), *Debaryomyces* (e.g. *D. hanseni*), *Hanseniaspora* (e.g. *H. uvarum*) *Kluyveromyces* (e.g. *K. loctis*), *Pichia* (*P. membranaefaciens*), *Rhodosporidium, Rhodotorula* (*Rh. mucilaginosa*), *Saccharomyces* (e.g. *S. bayanus, S. boulardi, S. carlsbergensis, S. cerevisiae, S. exiguus, S. florentinus, S. unisporus*), *Zygosaccharonmyces* (e.g. *Z. rouxii, Z. bailii*).

Moulds: species of *Aspergillus* (e.g. *A. niger, A. restrictus, A. versicolor*), *Byssochlamys* (e.g. *B. fulva, B. nivea*), *Eupenicillium, Eurotium, Fusarium, Geotrichum, Mucor, Neosartorya* (e.g. *N. fischeri* var. *fischeri*), *Penicillium* (e.g. *P. aurantiogriseum, P. brevicompactum, P. camembertii, P. candidum, P. chrysogenum, P. commune, P. corylophilum, P. cyclopium, P. discolor, P. nalgiovense, P. roquefortii*), *Talaryomyces* (e.g. *T. macrosporus*).

In a highly preferred aspect the microbicidal or microbiostatic effect is a bactericidal or bacteriostatic effect.

It is advantageous for the bactericidal or bacteriostatic effect to be in respect of Gram-positive bacteria and Gram-negative bacteria. Preferably the bactericidal or bacteriostatic effect is in respect of Gram-positive bacteria.

In a preferred aspect the bactericidal or bacteriostatic effect is in respect of an organism selected from Gram-positive bacteria associated with food spoilage or foodborne disease including *Bacillus* species, *Bacillus subtilis, Bacillus cereus, Listeria* species, *Listeria monocytogenes*, lactic acid bacteria, lactic acid spoilage bacteria, *Lactobacillus* species, *Staphylococcus aureus, Clostridium* species, *C. sporogenes, C. tyrobutyricum* and *C. botulinum* (when the antimicrobial material is recognised as effective against *C. botulinum* or is part of a system effective against *C. botulinum*).

In a preferred aspect the bactericidal or bacteriostatic effect of the invention in combination with a chelating agent is in respect of an organism selected from other micro-organisms associated with food spoilage or foodborne disease, including yeasts, moulds and Gram-negative bacteria including *Escherichia coli, Salmonella* species, and *Pseudomonas* species.

In a preferred aspect the bactericidal or bacteriostatic effect is in respect of lactic acid bacteria such as *Lactobacillus, Leuconostoc, Carnobacterium*, and *Enterococcus; Listeria monocytogenes*, spore forming heat resistant bacteria such as *Bacillus* and *Clostridium*; and *Brochothrix* thermosphacta.

In a preferred aspect the bactericidal or bacteriostatic effect is in respect of *Lactobacillus, Leuconostoc, Carnobacterium, Enterococcus, Listeria monocytogenes, Bacillus, Clostridium*; and *Brochothrix* thermosphacta.

In a preferred aspect the bacteriostatic effect is in respect of *Bacillus cereus.*

In a preferred aspect the bactericidal or bacteriostatic effect is in respect of *Listeria monocytogenes.*

Encapsulated Antimicrobial Material

Encapsulation technology has been applied to a number of food ingredients, usually to mask flavour or activity. The present invention is based on the realization that unexpected benefits are derivable from the encapsulation of antimicrobial materials.

Koontz & Marcey, 2003, J Agric Food Chemistry 51: 7106-7110 describes the formation of a natamycin/cyclodextrin inclusion product. The cyclodextrin acts as host molecules to protect mainly against light, but also low pH, heat and oxidation. However, this natamycin/cyclodextrin complex is not a true encapsulation. A molecule of natamycin will not 'fit' into the cavity of gamma-cyclodextrin, thus it can only be considered a partial encapsulation. Acidic conditions tend to destabilise this kind of complex, releasing the contents of the cyclodextrin molecule and the natamycin molecule is not completely enclosed and protected by the cyclodextrin molecules. Koontz et al. 2003. J Agric Food Chemistry 51: 7111-7114 has also described the stability of natamycin and its cyclodextrin inclusion complexes in aqueous solution.

EP115618 describes an anti-caking antimycotic food ingredient wherein the anti-caking agent is encapsulated and then treated with natamycin to provide antimycotic activity.

U.S. Pat. No. 5,445,949 describes a process for recovery of natamycin by separation of a hydrophobic fermentation product such as natamycin. The process involves a step including encapsulation of a protein but there is no mention of encapsulating the natamycin.

EP-A1-1382261 describes the use of microbial inhibitors such as natamycin for baked bread products, including shelf stable kits for making snacks or meals. The microbial inhibitor is not protected by encapsulation.

U.S. patent application Ser. No. 10/765,210, filed Jan. 28, 2004 relates to the protection of fine bakery goods by spraying the surface of the goods with a natamycin suspension and thus to increase the shelf life of the products.

WO 89/033208 describes a polyene macrolide powder for liposome preparation. The polyene macrolide is encapsulated in liposomes in order to modify the pharmokinetics of the antifungal in systemic diseases. The liposome is intended for pharmaceutical use only.

U.S. Pat. No. 5,821,233 concerns an antifungal composition wherein natamycin is incorporated in porous silica to provide delayed release of natamycin in an aqueous medium.

General descriptions of encapsulation processes may be found in Shahidi, F., and X.-Q., Han. 1993. Encapsulation of food ingredient. Critical Reviews in Food Science and Nutrition 33 (6): 501-547. The encapsulation of mold inhibitors is described by Ranum, P., 1999. Encapsulated mold inhibitors—the greatest thing since sliced bread in Cereal Foods World, Vol 44, No 5, p. 370-371.

U.S. Pat. No. 5,204,029 discloses a process for preparing edible microcapsules which contain a multiplicity of liquid cores. In the process, a water-in-oil emulsion, with the active ingredient dissolved in an inner aqueous phase, is spray cooled, which causes the solidification of the fat phase and the entrapment of the aqueous phase as minute droplets dispersed in a microcapsule. This process, however, leads to very unstable microcapsules from which the water phase migrates from the inner part of the microcapsule to an outer part. This further results in the condensation of the water on the wall of a container.

Kirk-Othmer Encyclopedia of Chemical Technology, $3^{rd}$ ed. Vol. 15, pp. 473 to 474, discloses a process in which liquids are encapsulated using a rotating extrusion head containing concentric nozzles. The process is only suitable for liquids or slurries, and the products of the process are large beads having meltable coatings, such as fats or waxes. However, the microcapsules containing a single liquid droplet as a core are very susceptible to rupture.

In their article "Mass preparation and characterization of alginate microspheres" in Process Biochemistry 35 (2000) 885 to 888 Mofidi, N. et al. describe a method for mass preparation of microspheres, in which method a sterilized alginate solution is prepared and the solution is then poured into a reactor containing a non-aqueous phase, while being stirred. An emulsion of alginate microdroplets is formed and an appropriate amount of the cross-linker is added. Microspheric alginate-gel particles fell to the bottom and they were collected by filtration.

Similarly, Wong, T. W. et al in J. Microencapsulation, 2002 Vol. 19, no 4, 511 to 522, describe release characteristics from pectin microspheres and the method for preparing these microspheres. In this method, pectin microspheres are prepared by a water-in-oil emulsion technique, in which minute droplets of pectin containing an active ingredient dispersed in a liquid hydrophobic continuous phase are hardened and collected by filtration.

Microencapsulation by a coacervation-phase separation process is known from an article by Joseph A. Bakan in Controlled Release Technologies, 1980 by Agis F. Kydonieus. The process consists of a series of three steps carried out under continuous agitation: (1) formation of three immiscible chemical phases; (2) deposition of the coating; and (3) rigidization of the coating.

Sanghvi, S. P. and Naim J. G. have studied the effect of viscosity and interfacial tension on the particle size of cellulose acetate trimellitate microspheres. The results are presented in their article in J. Microencapsulation, 1992, Vol. 9, no 2, 215 to 227.

In their article in Lebensm.-Wiss. u.-Technol., 33, 80 to 88 (2000) Lee, S. J. and Rosenberg, M. describe a double emulsification and heat gelation process for preparing whey protein-based microcapsules. The microcapsules prepared according to the described process are whey protein-based microcapsules containing an apolar core material.

In their article in Science Vol. 298, 1 Nov. 2002, Dinsmore et al. describe selectively permeable capsules composed of colloidal particles. The capsules are fabricated by the self-assembly of colloidal particles onto the interface of emulsion droplets. After the particles are locked together to form elastic shells, the emulsion droplets are transferred to a fresh continuous-phase fluid that is the same as that inside the droplets.

In a preferred aspect the encapsulated antimicrobial material is a particulate form.

Particle size may be important either in the injection aspect of the present invention or the tumbling aspect. The choice of particle size, for example to a particular maximum average particle size, may assist in the introduction of the encapsulated antimicrobial material into or onto the foodstuff. We have found that in the injection aspect of the particle size is particularly important. The particle size, and in particular the maximum average particle size, may determine the likelihood that the shell of the encapsulated antimicrobial material will withstand an injection process.

In a preferred aspect the encapsulated antimicrobial material has an average particle size of less than 500 µm, preferably less than 300 µm, preferably less than 250 µm, preferably less than 150 µm, preferably from 50 to 150 µm. In some aspects the encapsulated antimicrobial material has an average particle size of less than 100 µm, or less than 50 µm, or less than 25 µm.

As discussed above an aim of the present invention is to provide for the introduction of the antimicrobial material into or onto the foodstuff in a form protected from degradation or inactivation. However, the antimicrobial material should of course be released when required so as to provide the antimicrobial effect which is its purpose. Thus in one preferred aspect the shell is selected to provide sustained release of the antimicrobial material from the encapsulated antimicrobial material.

In one aspect of the present invention the shell is selected to provide sustained release of the antimicrobial material from the encapsulated antimicrobial material or to provide release under predetermined conditions. Suitable predetermined temperature conditions are: greater than 50° C., preferably greater than 60° C., preferably greater than 70° C., preferably greater than 72° C., preferably greater than 75° C., preferably from 72 to 78° C.

In one aspect of the present invention the shell is selected to prevent, reduce or inhibit degeneration or inactivation of the antimicrobial material. Preferably the degeneration which is to be prevented is by one or more factors selected from heat degradation, pH induced degradation (either by acid or alkaline pH), oxidation degradation, light degradation, protease degradation and glutathione adduct formation.

Thus in one further aspect the present invention provides use of an encapsulating material for the prevention, reduction or inhibition of the degeneration or inactivation of an antimicrobial material. Preferably the degeneration to be prevented is by one or more factors selected from heat degradation, pH induced degradation, protease degradation and glutathione adduct formation The shell is or comprises or may be formed from any suitable material.

The shell material useful in the invention may be is selected from the group comprising fats, oils, waxes, resins, emulsifiers or mixtures thereof, which are preferably food-grade. Preferably the shell material is selected from the group comprising animal oils and fats, fully hydrogenated vegetable or animal oils, partially hydrogenated vegetable or animal oils, unsaturated, hydrogenated or fully hydrogenated fatty acids, unsaturated, partially hydrogenated or fully hydrogenated fatty acid monoglycerides and diglycerides, unsaturated, partially hydrogenated or fully hydrogenated esterified fatty acids of monoglycerides or diglycerides, unsaturated, partially hydrogenated or fully hydrogenated free fatty acids, other emulsifiers, animal waxes, vegetable waxes, mineral waxes, synthetic waxes, natural and synthetic resins and mixtures thereof.

Animal oils and fats are such as, but not restricted to, beef tallow, mutton tallow, lamb tallow, lard or pork fat, sperm oil. Hydrogenated or partially hydrogenated vegetable oils are such as, but not restricted to, canola oil, cottonseed oil, peanut oil, corn oil, olive oil, soybean oil, sunflower oil, safflower oil, coconut oil, palm oil, linseed oil, tung oil and castor oil. Free fatty acids are such as, but not restricted to, stearic acid, palmitic acid and oleic acid. Other emulsifiers are such as, but not restricted to, polyglycerol esters, sorbitan esters of fatty acids. Animal waxes are such as, but not restricted to, beeswax, lanolin, shell wax or Chinese insect wax. Vegetable waxes are such as, but not restricted to, carnauba, candelilla, bayberry or sugarcane waxes. Mineral waxes are such as, but not restricted to, paraffin, microcrysalline petroleum, ozocerite, ceresin or montan. Synthetic waxes are such as, but not restricted to, low molecular weight polyolefin, polyol etheresters and Fisher-Tropsch process synthetic waxes. Natural resins are such as rosin, balsam, shellac and zein.

The hydrocolloid shell material of the invention may be any food-grade hydrocolloid which is susceptible to providing encapsulation, for example by the processes of the invention.

The material may be selected from the group comprising hydrocolloids, sodium alginate, gum arabic, gellan gum, starch, modified starch, guar gum, agar gum, pectin, amidified pectin, carrageenan, xanthan, gelatine, chitosan, mesquite gum, hyaluronic acid, cellulose derivatives such as cellulose acetate phtalate, hydroxy propyl methylcellulose (HPMC), methyl cellulose, ethyl cellulose and carboxy methyl cellulose (CMC), methyl acrylic copolymers, such as Eudragit®, psyllium, tamarind, xanthan, locust bean gum, whey protein, soy protein, sodium caseinate, any food-grade protein, shellac, zein, any synthetic or natural water-soluble polymers, and mixtures thereof.

Further preferred shell materials are selected from fats, emulsifiers, waxes (animal, vegetable, mineral or synthetic), liposome-forming lipids (such as glycerophospholipids and sterols), hydrocolloids, natural or synthetic polymers and mixtures thereof. Preferred materials are materials that are brine-insoluble or can be rendered brine insoluble by crosslinking, sintering or other means.

Preferably the glycerophospholipids are selected from phosphatidycholines, phosphatidyethanolamines and phosphatidylglycerols.

Preferably the sterols are selected from cholesterol, ergosterol, lanosterol, and stigmasterol.

Preferably the fat is a triglyceride, more preferably a vegetable triglyceride.

Preferably the emulsifier is selected from polysorbates, monoglycerides, diglycerides, acetic acid esters of mono-diglycerides, tartaric acid esters of mono-diglycerides and citric acid esters of mono-diglycerides.

Preferably the hydrocolloid is cross linked or gelled.

The cross-linking of the hydrocolloids may be is carried out by using cross-linking agents or by a variety of mechanisms. If the hydrocolloid is a protein or polysaccharide bearing amino groups, it can be cross-linked by using dialdehydes, such as glutaraldehyde. If the hydrocolloid is a polysaccharide, such as sodium alginate, gellan gum or pectin, it can be cross-linked with multivalent ions, such as calcium or magnesium. The cross-linking can also be carried out by other mechanisms, such as heating, pH adjustment, applying pressure or by enzymatic cross-linking. Proteins, for example, can be cross-linked by subjecting a protein to a high pressure, preferably from 5 to 200 bar, and/or by subjecting a protein to a temperature which is above the denaturation temperature of the protein. The enzymatic cross-linking of proteins can be carried out for example with transglutamidase. Based on the hydrocolloid used, a person skilled in the art is able to decide which method of gelling or cross-linking is used.

Preferably the hydrocolloid is selected from carrageenan.

In one aspect the hydrocolloid is selected from alginate, carrageenan, carboxymethyl cellulose (CMC), guar gum, locust bean gum (LBG), xanthan gum, microcrystalline cellulose (MCC), methyl cellulose (MC), cellulose ethers including hydroxy propyl methyl cellulose (HPMC), pectin, starch including native and modified starch, pregelatinated starch and non-pregelatinated starch, including starch from corn, potato, tapioca, wheat, and rice, gelatin, agar, and combinations thereof.

In one aspect the hydrocolloid is brine-insoluble, particularly at the temperature of use, or a hydrocolloids rendered insoluble by crosslinking or gelling.

Preferably the natural or synthetic polymer is selected from shellac, polyvinyl acetate, polymethyl-metacrylate and its derivatives, any brine-insoluble polymers.

In one further preferred aspect the shell is or comprises or may be formed from the group comprising fats, oils, waxes, resins, emulsifiers or mixtures thereof, which are preferably food-grade. Preferably the hydrophobic shell matrix is selected from the group comprising animal oils and fats, fully hydrogenated vegetable or animal oils, partially hydrogenated vegetable or animal oils, unsaturated, hydrogenated or fully hydrogenated fatty acids, unsaturated, partially hydrogenated or fully hydrogenated fatty acid monoglycerides and diglycerides, unsaturated, partially hydrogenated or fully hydrogenated esterified fatty acids of monoglycerides or diglycerides, unsaturated, partially hydrogenated or fully hydrogenated free fatty acids, other emulsifiers, animal waxes, vegetable waxes, mineral waxes, synthetic waxes, natural and synthetic resins and mixtures thereof.

Animal oils and fats are such as, but not restricted to, beef tallow, mutton tallow, lamb tallow, lard or pork fat, sperm oil. Hydrogenated or partially hydrogenated vegetable oils are such as, but not restricted to, canola oil, cottonseed oil, peanut oil, corn oil, olive oil, soybean oil, sunflower oil, safflower oil, coconut oil, palm oil, linseed oil, tung oil and castor oil. Free fatty acids are such as, but not restricted to, stearic acid, palmitic acid and oleic acid. Other emulsifiers are such as, but not restricted to, polyglycerol esters, sorbitan esters of fatty acids. Animal waxes are such as, but not restricted to, beeswax, lanolin, shell wax or Chinese insect wax. Vegetable waxes are such as, but not restricted to, carnauba, candelilla, bayberry or sugarcane waxes. Mineral waxes are such as, but not restricted to, paraffin, microcrysalline petroleum, ozocerite, ceresin or montan. Synthetic waxes are such as, but not restricted to, low molecular weight polyolefin, polyol etheresters and Fisher-Tropsch process synthetic waxes. Natural resins are such as rosin, balsam, shellac and zein.

In one further preferred aspect the shell is or comprises or may be formed from the group comprising hydrocolloids, sodium alginate, gum arabic, gellan gum, starch, modified starch, guar gum, agar gum, pectin, amidified pectin, carrageenan, xanthan, gelatine, chitosan, mesquite gum, hyaluronic acid, cellulose derivatives such as cellulose acetate phtalate, hydroxy propyl methylcellulose (HPMC), methyl cellulose, ethyl cellulose and carboxy methyl cellulose (CMC), methyl acrylic copolymers, such as Eudragit®, psyllium, tamarind, xanthan, locust bean gum, whey protein, soy protein, sodium caseinate, any food-grade protein, shellac, zein, any synthetic or natural water-soluble polymers, any water-insoluble microparticles, such as silicone dioxide, titanium dioxide, synthetic or natural food-grade polymer beads and mixtures thereof.

The encapsulated antimicrobial material may be prepared by any suitable process. In one preferred aspect the encapsulated antimicrobial material is prepared by or is obtainable by a process selected from spray cooling, and fluidised bed coating.

Further preferred aspects include
(a) spray cooling in fats, waxes or emulsifiers
(b) fluidised bed coating with acid-stable shellac coating, fats, waxes, or emulsifiers, or any other hydrophobic and/or acid stable coating
(c) complex or simple co-acervation in cross-linked hydrocolloids.

The encapsulating process is preferably selected from a fluidized bed process, liposome encapsulation, spray drying, spray cooling, extrusion, centrifugal co-extrusion, coacervation and mixtures thereof. Fluidized bed encapsulation and coacervation are the most preferred processes for providing the material of the present invention.

In a preferred fluidized bed anti-microbial material is co-processed with an encapsulating material in an aqueous solution or suspension or in a molten state to provide a shell around the anti-microbial material.

In the fluidized bed encapsulation the appropriate shell material is typically applied from aqueous solutions or suspensions include HPMC, methylcellulose, microcrystalline cellulose and other cellulosic derivatives with or without stearic acid, other fatty acids, or other hydrophobic additives. Appropriate shell material applied from the molten state include lipids, mono-, di- or tro-glycerides, fatty acids, fatty alcohols, waxes, or mixture thereof or any other meltable hydrophobic material.

In a preferred coacervation process, an encapsulating material comprising a hydrocolloid or a mixture of hydrocolloids is used to provide the shell.

The encapsulation of the antimicrobial material may be performed by processes which are novel in combination with antimicrobial material and which provide unexpected benefits, for example to the food industry. The encapsulation processes and encapsulating materials or shell materials are selected depending on the nature of the continuous phase in the food application. The shell material must be water-insoluble if the continuous phase of the food application is water-based, and vice-versa in order to provide slow and/or delayed release as well as protection/segregation.

Suitable encapsulating processes comprise fluidized bed processes, liposome encapsulation processes, spray drying processes, spray cooling processes, extrusion processes, co-extrusion processes (such as centrifugal co-extrusion), coacervation processes and combinations thereof.

In a special double encapsulation process, the present invention provides a microcapsule which comprises a solidified hydrophobic shell matrix, an encapsulated aqueous bead or beads encapsulated in the solidified hydrophobic shell matrix, and antimicrobial material as an active ingredient incorporated in the encapsulated aqueous bead or beads. Details of the double encapsulation process are disclosed in GB2388581.

This antimicrobial material dosage form is provided by a double encapsulation method for preparing microcapsules, which method comprises the steps of a) providing an aqueous phase and antimicrobial material incorporated in the aqueous phase, b) providing a hydrophobic phase in melted form, c) incorporating or dissolving an encapsulating material or mixture of encapsulating materials in the aqueous phase or in the hydrophobic phase, d) combining the aqueous phase with the hydrophobic phase and homogenizing or mixing the combined phases to form a water-in-oil emulsion, e) encapsulating the aqueous phase in the emulsion, thus converting the liquid aqueous phase into encapsulated aqueous beads, whereby a dispersion comprising aqueous beads is formed and the antimicrobial material is incorporated in the aqueous beads, and f) processing the dispersion obtained in step e) to form microcapsules where the encapsulated aqueous beads are further encapsulated in or by the solidified hydrophobic shell matrix.

The encapsulation process of the present invention may also include gelling, cross-linking, coacervation, sintering or any other suitable means. In the above double encapsulation this results in a dispersion where encapsulated aqueous beads comprising the active antimicrobial material ingredient are dispersed in the hydrophobic phase. The dispersion is cooled below the melting or dropping point of the hydrophobic phase by any suitable process, which results in the formation of microcapsules. The cooling process can be performed, for example by spray cooling or fluidized bed cooling. The microcapsules comprise a number of encapsulated aqueous beads, which further contain the antimicrobial material, and the encapsulated aqueous beads are further encapsulated in a solidified hydrophobic shell matrix.

An advantage of the present invention is that the antimicrobial material is protected by the shell and that the release of the antimicrobial material from the capsules can be controlled. The release rate may be controlled, for instance, by the choice and the amount of the shell material. Thus, the release rate may be controlled by the melting of the hydrophobic shell or by the diffusion of water into the capsule and subsequent migration of antimicrobial material outside the capsule. The release rate of antimicrobial material from the capsules may be selected according to the intended use by selecting a suitable encapsulating material. The release of the antimicrobial material from the capsules of the present invention can be controlled and the release can be initiated in various ways, for example by heat treatment, e.g. by heating, such as in a microwave oven or baking oven, or by freezing, by stress treatment or by any other suitable process. The release of the active ingredients from the capsules of the present invention can also be sustained or it can happen very slowly.

Coacervation is a process which works for both water- and fat-based applications since the shell is crosslinked and not soluble in either water or fat The coacervation process typically involves 1) preparing a suspension of antimicrobial material in an aqueous solution of hydrolloids, 2) decreasing the solubility of the hydrocolloids, to cause a phase separation and the formation of a hydrocolloid-rich third phase by use of additives or by adjusting the temperature, 3) processing the tri-phasic system in such as way as to deposit the newly formed coacervate phase onto the suspended antimicrobial material particles and finally 4) hardening the hydrocolloid shell around the antimicrobial material by adjusting the temperature, adding chemical or enzymatic crosslinker or otherwise followed by the isolation of the microcapsules by freeze-drying, spray-drying, filtration or any other means.

Fluidized bed coating is particularly suitable for (food) applications where the continuous phase is water, the possible coating materials include lipids (mono-, di-, triglycerides, fatty acids, waxes and mixtures) applied from the melted form, water-insoluble polymers applied from an ethanolic solution (such as zein and shellac). For applications where the continuous phase is fat, the coating materials include natural, modified or synthetic hydrocolloids (carrageenan, alginate, pectin, locust bean gum (LBG), hydroxypropyl methylcellulose (HPMC), methylcellulose) with or without additives (such as film forming agents) applied from a water solution or suspension. The particle size of the antimicrobial material should preferably be over 100 µm, preferably over 150 µm.

A double encapsulation according to the present invention is suitable for fat-based food applications. The inner phase may be composed of water containing a dissolved antimicrobial material/β-cyclodextrin complex and any gelled/crosslinked hydrocolloids or may be composed of glycols (such as ethylene glycol) containing dissolved antimicrobial material and gelled/crosslinked zein.

In a liposome encapsulation antimicrobial material may be incorporated in the lipidic bilayer of the liposome phase.

Spray cooling is a process particularly suitable for water-based (food) applications.

Antimicrobial material is typically incorporated and suspended in melted lipid (mono-, di-, triglycerides, fatty acids, waxes and mixtures) and atomized in cool air to form solid particles containing encapsulated antimicrobial material.

Spray drying is particularly suitable for fat-based (food) applications. Antimicrobial material is typically incorporated and suspended in aqueous solution of hydrocolloids (gum arabic, modified starch, maltodextrins, whey proteins, caseinate, or the like) with or without additives (such as emulsifiers) and the mixture is atomized in hot air to evaporate the water and form a solid particles containing encapsulated antimicrobial material.

Extrusion is a process which is typically suitable for fat-based (food) applications and centrifugal coextrusion is typically suitable for water-based (food) applications.

Encapsulation in crosslinked hydrocolloid beads is suitable for both water- and fat based food applications. A suspension of antimicrobial material (alone or in combination with a suitable solvent) is typically prepared in aqueous alginate, low ester pectin or any other "crosslinkable" hydrocolloids and added dropwise or sprayed into a bath of aqueous calcium ions. The crosslinked beads or particles containing the encapsulated antimicrobial material are collected by filtration and used as is (wet) or dried by fluidized bed or any other suitable means.

Based on the present disclosure, the person skilled in the art is able to select a suitable encapsulation process as well as the right type and amount of shell material to be used in any one specific (food) application based on the conditions required to protect and to release the antimicrobial material in accordance with the present invention.

The encapsulation processes of the present invention are described in some detail below:

1. Fluidized Bed Encapsulation

The antimicrobial material is preferably used in dry powder form. If the raw antimicrobial material particle size is too fine, the powder can be agglomerated in an suitable equipment using a binder solution (solution of sticky hydrocolloids such as alginate or maltodextrine) in order to obtain a dense powder of particle size between 100-500µ. The appropriate powder is then introduced into the coating chamber of a fluidized-bed microencapsulation unit and fluidized at inlet air flow rate of 20-135 cm/s at the bottom plate and temperature between 5 to 75° C. are used to fluidized the particles. A coating material is then sprayed onto the fluidized bed of antimicrobial using a double fluid nozzle and high pressure atomization air.

In one example, a melted mixture of triglyceride and additives is sprayed onto the antimicrobial powder to form a continuous layer of fat around each individual particle as the melted fat spread and solidifies on the particles. The amount of fat applied can be up to 60%, but no usually no lower than 15% w/w.

In another example, a dispersion or solution of coating material in water and/or ethanol is sprayed onto the fluidized particles and the fluidization air is used to evaporate the solvent or the water, which leaves behind a continuous film of coating material on the antimicrobial particles.

Examples of coating material in this case include any hydrocolloids (polysaccharides, proteins, shellac, zein or any other soluble or dispersible coating materials).

2. Liposome Encapsulation.

Typically, liposomes are prepared using a dehydration-hydration method involving organic solvent, such as the one described below. However, solvent-free methods, more suitable for food ingredients, are also available using microfluidization or homogenization devices or by repeated freeze-thaw cycles.

A typical procedure for the preparation of liposome-encapsulated antimicrobial material involves the preparation of a solution of 1 g of a bilayer-forming lipid and 100 mg of cholesterol or alpha-tocopherol in a suitable organic solvent and evaporating the solvent so as to form a thin dry lipid film on the bottom of the container. After thorough drying of the lipid film, 1 L of water containing antimicrobial material at or over the saturation concentration (antimicrobial material solubility can be increased if desired by the formation of alkaline salts) is added to the container and the mixture is thoroughly mixed or homogenized.

The resulting suspension of multilamellar vesicle (MLV) can be further processed by microfluidization and or sonication to form smaller more homogenous small unilamellar vesicle (SUV). The suspension of liposome-encapsulated antimicrobial material can be added directly to the application or dried by lyophilization or any other appropriate drying procedures.

3. Spray Drying

Antimicrobial material can be encapsulated in a matrix of hydrocolloids by means of spray drying. In a typical procedure, an aqueous antimicrobial material suspension in which a hydrocolloid or a mixture of hydrocolloids is dissolved (water-soluble polysaccharides, proteins, modified polysaccharides with or without film forming agents such as oligosaccharides, plasticizers, emulsifiers or other additives) is prepared at near-neutral pH (to minimize degradation of antimicrobial material). Then, the mixture is pumped through an atomizer (rotary atomizer, pressure nozzle, double fluid nozzle or any other atomization device) into a drying chamber co- or counter-currently with heated air.

The temperature of the heated air is typically between 160 and 200° C., can be as high as 300° C., but is preferably in the range of 100-160° C. Evaporation of water yields a free flowing powder of microcapsules containing dispersed antimicrobial material in the dry hydrocolloid(s) matrix.

4. Spray Cooling

In spray cooling/chilling/congealing of antimicrobial material, the powdered antimicrobial material is dispersed in a molten lipid or mixture of lipids (mono-, di-, tri-glycerides, esterified glycerides, animal, vegetable or mineral waxes, any other meltable material at temperature between 45 and 125° C.) with or without the aid of surface-active additives. The dispersion is then pumped through an atomizer (rotary atomizer, pressure nozzle, double fluid nozzle, spinning disk or any other atomization device) into a cooling chamber co- or counter-currently with cooled air.

The temperature of the cooled air is typically between −10 and 30° C., but can be as low as −40° C. solidification of the lipid yields a free flowing powder of microcapsules containing dispersed antimicrobial material in the crystallized lipidic matrix.

5. Extrusion

Encapsulation of antimicrobial material by extrusion can be achieved by processing the powdered antimicrobial material (preferably of small particle size) together with a melted or plasticized polymeric shell material in a double- or single-screw extruder under pressure, followed by the cooling or the drying of the mass coming out of the extruder die and milling or crimpling to the appropriate particle size. The polymeric mass is melted in the extruder at relatively high temperatures in the presence of small amount of water, which causes the mass to become flowable. The mass, in which the antimicrobial material is incorporated, is extruded and cooling results in the transformation of the mass into a glassy state which is highly impermeable to oxygen and other hydrobobic external agents. Shell materials suitable for extrusion of antimicrobial material include oligosaccharides, polysaccharides, modified polysaccharide, proteins or mixtures thereof with or without the use of plasticizing, emulsifying or stabilizing additives.

6. Centrifugal Co-Extrusion

Encapsulation of antimicrobial material by centrifugal co-extrusion is a variation of the spray cooling process. In centrifugal coextrusion of antimicrobial material, the powdered antimicrobial is first dispersed in a molten lipid or mixture of lipids (mono-, di-, tri-glycerides, esterified glycerides, animal, vegetable or mineral waxes, any other meltable material at temperature between 45 and 125° C.) with or without the aid of surface-active additives. The dispersion is then pumped through the inner part of a double fluid nozzle while another stream of molten lipid or mixture of lipids (same as above) is pumped through the outer part of the double fluid nozzle. The nozzle is rotated around its axis so as to break up the stream of melted fat in discrete globules, which are solidified by cooled air. The resulting microcapsules are composed of an outer layer of solidified fat encapsulating a core of solidified fat containing dispersed antimicrobial material.

7. Coacervation

The antimicrobial material dosage form of the present invention can be formed by coacervation. The coacervation of the shell material, such as hydrocolloid, is carried out by using any suitable coacervation process. The coacervation can be performed for example by adding salt(s), sugar(s), or other additives, which cause the phase separation of the hydrocolloid(s). The coacervation can also be performed by subjecting the emulsion to heating, cooling, pH change by adding acid or base, which cause the phase separation of the hydrocolloid(s). The deposition of the coacervated phase around the aqueous phase is spontaneous and driven by surface tension forces. The coacervate layer can afterwards be subjected to cross-linking or hardening by any suitable means, which are known to persons skilled in coacervation.

The shell materials suitable for coacervation are selected form the group comprising any mixture of one or many ionic hydrocolloids and one or many amphoteric hydrocolloids, such as any mixture of polysaccharides and proteins, gelatine/arabic gum, gelatine/CMC, any proteins/ionic hydrocolloids, any combination of hydrocolloids and a solubility-reducing agent such as salts, sugars, acids or bases.

8. Double Encapsulation

According to a special aspect of the present invention, the antimicrobial material suspension is double encapsulated in microcapsules. In that case, the antimicrobial material is first incorporated (suspended) in an aqueous phase containing encapsulating material, such as hydrocolloid or any other suitable encapsulating material or mixture thereof, and the aqueous phase is encapsulated, for example by gelling, cross-linking, coacervation, sintering or by any other suitable means, and the resulting encapsulated aqueous bead or beads is/are further encapsulated in a solidified hydrophobic shell material.

In one preferred aspect the encapsulated anti-microbial material is encapsulated by one and only one shell. In this aspect the present invention provides an anti-microbial material in an encapsulated form, comprising (i) a core comprising an anti-microbial material and (ii) a shell of encapsulating material, wherein the shell of encapsulating material is impermeable to the anti-microbial material and wherein the anti-microbial material is encapsulated only by shell (ii).

A hydrophobic shell material is selected based on desired properties of the capsules, for example based on the intended use of the capsules, storage temperature, etc. The hydrophobic shell material should have a melting point above 45° C. so that it can be stored at room temperature, in general any hydrophobic material can be used if the capsules are stored below the melting temperature of the hydrophobic material.

In this application, melted form means that the hydrophobic phase is at the lowest temperature at which the hydrophobic phase is sufficiently fluid to drip, as determined by test method ASTM D 566 or D 265.

In one preferred aspect the shell of the encapsulated anti-microbial material is capable of withstanding injection into or onto the foodstuff.

In one preferred aspect the shell of the encapsulated antimicrobial material is capable of withstanding a pressure of greater than 1.5 bar, for example. greater than 2.0 bar, for example greater than 3.0 bar.

In one preferred aspect the shell of the encapsulated antimicrobial material is capable of withstanding a shear force of greater than that typically encountered during injection.

As discussed herein the shell of the encapsulated antimicrobial material may be selected to provide sustained release of the antimicrobial material from the encapsulated antimicrobial material or to provide release under predetermined conditions. Furthermore the shell of the encapsulated antimicrobial material may be selected to prevent, reduce or inhibit degeneration or inactivation of the antimicrobial material. Preferably the degeneration which is to be prevented is by one or more factors selected from heat degradation, pH induced degradation, protease degradation and glutathione adduct formation.

We have found that provision of an encapsulated antimicrobial material in which the shell is selected to provide sustained release of the antimicrobial material from the encapsulated antimicrobial material or to provide release under predetermined conditions is advantageous irrespective of the manner in which the encapsulated antimicrobial material is contacted with a foodstuff. For example the encapsulated antimicrobial material may be contacted with a foodstuff (or other material) by means other than injection or tumbling. In other words, we have provided an encapsulated antimicrobial material in which antimicrobial material is released in a sustained manner or when the encapsulated antimicrobial material is placed under predetermined conditions.

Thus in a further aspect (the "encapsulated material" aspect) the present invention provides an antimicrobial material in an encapsulated form, comprising a core of antimicrobial material and shell of encapsulating material, wherein the shell of encapsulating material is impermeable to the antimicrobial material.

This preservation system has the benefits of maximising the potential of the antimicrobial material (such as nisin) which may added to the food, offering no taste impact, cheapness, ease-of-use, ease-of-manufacture and stability. In some aspects of the invention it may also be described as "natural" for food labelling purposes.

In this and other aspects of the invention, by the term "encapsulated" it is meant the packaging of solid particles or liquid droplets of active ingredient (or particles or droplets containing the active ingredient) within a secondary material so as to fully surround the solid particles or liquid droplets with a protective or functional shell material. This contrasts with the loose use of the term encapsulated to refer to simple coating. For example Cahill et al. teaches the coating of nisin with a porous matrix of alginate. External material can freely diffuse in the alginate matrix and the coated nisin can easily diffuse out through the large pores of the matrix. This is not "encapsulation" in the present sense.

Each of the preferred aspects described herein are applicable to the encapsulated material aspect of the invention. Particularly preferred aspects include
the antimicrobial material is an antibacterial material.
the antimicrobial material is a bacteriocin.
the antimicrobial material is at least nisin.
the shell is selected to provide sustained release of the antimicrobial material from the encapsulated antimicrobial material.
the shell is selected to prevent, reduce or inhibit degeneration or inactivation of the antimicrobial material.
shell is selected to prevent, reduce or inhibit degeneration or inactivation of the antimicrobial material by one or more factors selected from heat degradation, pH induced degradation, protease degradation and glutathione adduct formation
the shell is selected to release the antimicrobial material from the encapsulated antimicrobial material on contact with a foodstuff, preferably the foodstuff is a marinade
the antimicrobial material provides a bactericidal or bacteriostatic effect in respect of *Listeria monocytogenes*
the encapsulated material is utilised in the protection of microbial spoilage of a foodstuff selected from raw meat products, cooked meat products, raw seafood products, cooked seafood products, raw poultry products and cooked poultry products
the encapsulated material is utilised in the protection of microbial spoilage of a raw poultry product.

Particularly preferred aspects further include
the antimicrobial material is an antifungal material.
the antimicrobial material is at least natamycin.
the shell is selected to provide sustained release of the antimicrobial material from the encapsulated antimicrobial material.
the shell is selected to prevent, reduce or inhibit degeneration or inactivation of the antimicrobial material.
shell is selected to prevent, reduce or inhibit degeneration or inactivation of the antimicrobial material by one or more factors selected from heat degradation, pH induced degradation, protease degradation and glutathione adduct formation
the shell is selected to release the antimicrobial material from the encapsulated antimicrobial material on contact with a foodstuff, preferably the foodstuff is a bakery product Highly preferred aspects of all aspects of the invention and in particular the encapsulated material aspect include
the antimicrobial material is at least nisin.
the shell is selected to prevent, reduce or inhibit degeneration or inactivation of the antimicrobial material by one or more factors selected from heat degradation, pH induced degradation, protease degradation and glutathione adduct formation
the antimicrobial material provides a bactericidal or bacteriostatic effect in respect of *Listeria monocytogenes*
the encapsulated material is utilised in the protection of microbial spoilage of a foodstuff selected from raw meat products, cooked meat products, raw seafood products, cooked seafood products, raw poultry products and cooked poultry products
the encapsulated material is utilised in the protection of microbial spoilage of a raw poultry product.
the antimicrobial material is at least nisin; and the shell is selected to prevent, reduce or inhibit degeneration or inactivation of the antimicrobial material by one or more factors selected from heat degradation, pH induced degradation, protease degradation and glutathione adduct formation
the antimicrobial material is at least nisin; and the antimicrobial material provides a bactericidal or bacteriostatic effect in respect of *Listeria monocytogenes*
the antimicrobial material is at least nisin; and the encapsulated material is utilised in the protection of microbial spoilage of a foodstuff selected from raw meat products, cooked meat products, raw seafood products, cooked seafood products, raw poultry products and cooked poultry products the shell is selected to prevent, reduce or inhibit degeneration or inactivation of the antimicrobial material by one or more factors selected from heat degradation, pH induced degradation, protease degradation and glutathione adduct formation; and the antimicrobial material provides a bactericidal or bacteriostatic effect in respect of *Listeria monocytogenes* the shell is selected to prevent, reduce or inhibit degeneration or inactivation of the antimicrobial material by one or more factors selected from heat degradation, pH induced degradation, protease degradation and glutathione adduct formation; and the encapsulated material is utilised in the protection of microbial spoilage of a foodstuff selected from raw meat products, cooked meat products, raw seafood products, cooked seafood products, raw poultry products and cooked poultry products the antimicrobial material provides a bactericidal or bacteriostatic effect in respect of *Listeria monocytogenes*; and the encapsulated material is utilised in the protection of microbial spoilage of a foodstuff selected from raw meat products, cooked meat products, raw seafood products, cooked seafood products, raw poultry products and cooked poultry products the antimicrobial material is at least nisin; and the shell is selected to prevent, reduce or inhibit degeneration or inactivation of the antimicrobial material by one or more factors selected from heat degradation, pH induced degradation, protease degradation and glutathione adduct formation; and the antimicrobial material provides a bactericidal or bacteriostatic effect in respect of *Listeria monocytogenes* the antimicrobial material is at least nisin; and the shell is selected to prevent, reduce or inhibit degeneration or inactivation of the antimicrobial material by one or more factors selected from heat degradation, pH induced degradation, protease degradation and glutathione adduct formation; and the encapsulated material is utilised in the protection of microbial spoilage of a foodstuff selected from raw meat products, cooked meat products, raw seafood products, cooked seafood products, raw poultry products and cooked poultry products the antimicrobial material is at least nisin; and the antimicrobial material provides a bactericidal or bacteriostatic effect in respect of *Listeria monocytogenes*; and the encapsulated material is utilised in the protection of microbial spoilage of a foodstuff selected from raw meat products, cooked meat products, raw seafood products, cooked seafood products, raw poultry products and cooked poultry products the shell is selected to prevent, reduce or inhibit degeneration or inactivation of the antimicrobial material by one or more factors selected from heat degradation, pH induced degradation, protease degradation and glutathione adduct formation; and the antimicrobial material provides a bactericidal or bacteriostatic effect in respect of *Listeria monocytogenes*; and the encapsulated material is utilised in the protection of microbial spoilage of a foodstuff selected from raw meat products, cooked meat products, raw seafood products, cooked seafood products, raw poultry products and cooked poultry products the antimicrobial material is at least nisin; and the shell is selected to prevent, reduce or inhibit degeneration or inactivation of the antimicrobial material by one or more factors selected from heat degradation, pH induced degradation, protease degradation and glutathione adduct formation; and the antimicrobial material provides a bactericidal or bacteriostatic effect in respect of *Listeria monocytogenes*; and the encapsulated material is utilised in the protection of microbial spoilage of a foodstuff selected from raw meat products, cooked meat products, raw seafood products, cooked seafood products, raw poultry products and cooked poultry products Further highly preferred aspects of all aspects of the invention and in particular the encapsulated material aspect include the antimicrobial material is at least natamycin.

the shell is selected to provide sustained release of the antimicrobial material from the encapsulated antimicrobial material.

the shell is selected to prevent, reduce or inhibit degeneration or inactivation of the antimicrobial material.

shell is selected to prevent, reduce or inhibit degeneration or inactivation of the antimicrobial material by one or more factors selected from heat degradation, pH induced degradation, protease degradation and glutathione adduct formation the shell is selected to release the antimicrobial material from the encapsulated antimicrobial material on contact with a foodstuff, preferably the foodstuff is a bakery product the antimicrobial material is at least natamycin. and the shell is selected to provide sustained release of the antimicrobial material from the encapsulated antimicrobial material.

the antimicrobial material is at least natamycin and the shell is selected to prevent, reduce or inhibit degeneration or inactivation of the antimicrobial material.

the antimicrobial material is at least natamycin and the shell is selected to prevent, reduce or inhibit degeneration or inactivation of the antimicrobial material by one or more factors selected from heat degradation, pH induced degradation, protease degradation and glutathione adduct formation the antimicrobial material is at least natamycin and the shell is selected to release the antimicrobial material from the encapsulated antimicrobial material on contact with a foodstuff, preferably the foodstuff is a bakery product the antimicrobial material is at least natamycin, the shell is selected to provide sustained release of the antimicrobial material from the encapsulated antimicrobial material and the shell is selected to prevent, reduce or inhibit degeneration or inactivation of the antimicrobial material.

the antimicrobial material is at least natamycin, the shell is selected to provide sustained release of the antimicrobial material from the encapsulated antimicrobial material and the shell is selected to prevent, reduce or inhibit degeneration or inactivation of the antimicrobial material by one or more factors selected from heat degradation, pH induced degradation, protease degradation and glutathione adduct formation the antimicrobial material is at least natamycin, the shell is selected to prevent, reduce or inhibit degeneration or inactivation of the antimicrobial material, and the shell is selected to release the antimicrobial material from the encapsulated antimicrobial material on contact with a foodstuff, preferably the foodstuff is a bakery product the antimicrobial material is at least natamycin, the shell is selected to prevent, reduce or inhibit degeneration or inactivation of the antimicrobial material by one or more factors selected from heat degradation, pH induced degradation, protease degradation and glutathione adduct formation, and the shell is selected to release the antimicrobial material from the encapsulated antimicrobial material on contact with a foodstuff, preferably the foodstuff is a bakery product the antimicrobial material is at least natamycin and the shell is selected to prevent, reduce or inhibit degeneration or inactivation of the antimicrobial material by pH induced degradation the antimicrobial material is at least natamycin and the shell is selected to prevent, reduce or inhibit degeneration or inactivation of the antimicrobial material by pH induced degradation, and the shell is selected to provide sustained release of the antimicrobial material from the encapsulated antimicrobial material.

the antimicrobial material is at least natamycin and the shell is selected to prevent, reduce or inhibit degeneration or inactivation of the antimicrobial material by pH induced degradation and the shell is selected to release the antimicrobial material from the encapsulated antimicrobial material on contact with a foodstuff, preferably the foodstuff is a bakery product the antimicrobial material is at least natamycin and the shell is selected to prevent, reduce or inhibit degeneration or inactivation of the antimicrobial material by pH induced degradation, the shell is selected to provide sustained release of the antimicrobial material from the encapsulated antimicrobial material, and the shell is selected to release the antimicrobial material from the encapsulated antimicrobial material on contact with a foodstuff, preferably the foodstuff is a bakery product the antimicrobial material is at least natamycin and the shell is selected to prevent, reduce or inhibit degeneration or inactivation of the antimicrobial material by pH induced degradation, the shell is selected to provide sustained release of the antimicrobial material from the encapsulated antimicrobial material, and the shell is selected to release the antimicrobial material from the encapsulated antimicrobial material on contact with a bakery product Foodstuff In one aspect the invention is to improve the use of antimicrobial materials in the food industry and, consequently, the shell of the present invention should be made of a physiologically acceptable material suitable for addition to a food product. The shell provides protection for the antimicrobial material and it should be effective in substantially retaining said antimicrobial material within said shell during processing of food products. Once introduced into a food product, the shell should be effective in providing slow or delayed release of the encapsulated antimicrobial material into the food product.

Most preferably, the antimicrobial material of the present invention has a shell which is effective in protecting the encapsulated antimicrobial material from degradation by conditions prevailing in the production of a product whereto the encapsulated antimicrobial material is added, and/or in protecting food ingredients from unwanted attack by antimicrobial material at the wrong time, as well as in providing release of antimicrobial material in said finished product.

The term "food" as used in the present specification and claims refers generally to edible products and beverages of the food and feed industry. The edible products in question are mainly nutritive and/or enjoyable products requiring preservation for their storage between the time of production and eventual use.

Many foodstuffs may be protected by the present invention. Typical foodstuffs are raw meat, cooked meat, raw poultry products, cooked poultry products, raw seafood products, cooked seafood products, [raw or cooked meat, poultry and seafood products], ready to eat meals, pasta sauces, pasteurised soups, mayonnaise, salad dressings, marinades, oil-in-water emulsions, margarines, low fat spreads, water-in-oil emulsions, dairy products, cheese spreads, processed cheese, dairy desserts, flavoured milks, cream, fermented milk products, cheese, butter, condensed milk products, ice cream mixes, soya products, pasteurised liquid egg, bakery products (such as crumpets), confectionery products, fruit products, and foods with fat-based or water-containing fillings.

Further preferred foodstuffs, particularly when the antimicrobial material is natamycin are salad dressings, acidic dairy products (including natural cheese, cottage cheese, acidified cheese, cream cheese, yoghurt, sour cream, processed cheese), fruit juices, acidic drinks, alcoholic drinks (including wine and beer), chilled dough and cooked or uncooked bakery products, dairy fillings and toppings for baked goods, surface glazes and coatings for bakery items and other heat-processed items, condiments, dips, purees, pickles, marinades, marinated meat or poultry, breaded meat or poultry, pizza toppings and bases, fast food products, kits for making snacks or meals, kits for making bakery products, pet food, broiler feed and any other acidic, heat-processed and/or fungal fermented food products.

An especially preferred preserved food product is a sliced or cut bakery product, especially sliced bread, wherein encapsulated material such as natamycin has been incorporated into the dough before cooking and provides preservation of the bakery product after baking.

A special benefit is provided by a preferred embodiment of the invention when the encapsulated antimicrobial material is included in a dough prior to the cooking of a yeast-leavened bakery product since the yeast is protected by the encapsulating shell from direct contact with the antimicrobial material during the leavening.

Furthermore, the encapsulated antimicrobial material is preferably protected against the heat of the baking by the shell. Antimicrobial material is degraded by exposure to heat. During baking, which is typically performed at temperatures ranging from 180 to 300° C., antimicrobial material degradation would significantly reduce the level of active antimicrobial material in the finished baked product. By selecting an encapsulating material having a sufficient heat stability, the heat degradation of antimicrobial material can be substantially reduced. During baking and/or after baking, the shell releases the antimicrobial material so that the finished product is effectively protected against fungal attack.

A preferred use of the present invention comprises use of the antimicrobial material form in dough for bread, which is to be sliced for sale. The antimicrobial material released from within the capsule shell in the finished product protects the individual cut bread slices from fungal attack.

Sliced bread is a very convenient food product for consumers. However, the slicing provides an additional process step in the production, and one which is typically performed after the bread has cooled after baking when the product is very susceptible to fungal attack. When the slicing is performed, contamination may take place and as a result, the sliced product will show fungal growth between the slices during storage. The bread slicing exposes a much greater surface area of the bread to contamination particularly by molds.

The copending patent application U.S. Ser. No. 10/765, 210, filed Jan. 28, 2004 and included herein by reference, discloses the protection of fine bakery goods by spraying the surface of the goods with antimicrobial material and thus to increase the shelf life of the product. However, it is impossible to apply antimicrobial material between the slices of sliced bread. The present invention provides a solution to the problem of protecting sliced bread by antimicrobial material.

Another preferred preserved food product comprises an acidic food product, into which the material of the present invention such as natamycin has been incorporated.

In one preferred aspect the foodstuff is a bakery product.

Many antimicrobial materials such as natamycin in solution are fairly stable at neutral pH but is easily degraded, especially at room temperature when the pH rises above pH 10 or sinks below pH 4.5, and especially below pH 4. Thus, for instance antimicrobial materials included in acidic products will gradually degrade and will consequently leave the product unprotected at storage and use. The rate of antimicrobial material degradation increases as the temperature is increased.

Many acidic products, such as salad dressings and condiments are stored at ambient temperature and used during a prolonged space of time even after opening of the package. Acidic beverages such as fruit juices can be stored at ambient temperature and may be open to fungal attack. Marinades and marinated meat and poultry are typically stored for a prolonged time at ambient temperature. Many acidic dairy products are stored at ambient or chilled temperatures and may be spoiled by fungal growth. When encapsulated antimicrobial material is added to such products, the encapsulation protects the enclosed antimicrobial material and slowly allows it to diffuse into the product to replace any degraded antimicrobial material thus keeping the amount of active antimicrobial material at a suitable antifungal level in the product.

The encapsulated antimicrobial material of the present invention provides similar benefits in other acidic products, especially those that are stored at ambient temperature.

Food products, which are especially suitable for being preserved by the novel antimicrobial material dosage form of the present invention include fat-containing acidic products such as salad dressings and acidic dairy products (natural cheese, cottage cheese, acidified cheese, cream cheese, yoghurt, sour cream). Many of these products can be preserved with antimicrobial material in non-encapsulated form and they will generally keep well, if chill stored. However, if they are stored at ambient temperature, degradation of the antimicrobial material is a problem. This problem is solved by the encapsulated antimicrobial material of the present invention.

In USA salad dressings are usually cold-processed, in which case contaminant yeasts and moulds are potential spoilage contaminants. The combination of ambient temperature storage and low pH causes rapid antimicrobial material degradation. If non-encapsulated antimicrobial material, which is added when the dressings are first made fails to rapidly kill all the contaminant yeasts, and if any mould spores are present (these are not normally killed by antimicrobial material), there is potential for fungal growth/spoilage once antimicrobial material levels drop.

By use of the encapsulated antimicrobial material of the present invention the acidic food products may be stored at ambient temperature for up to 12 months. The preferred processes for encapsulation for the acidic food products comprise coacervation and fluidized bed encapsulation.

The encapsulating shell may also be designed to protect the antimicrobial material against any heat during processing of the acidic food product, such as pasteurization at temperatures of typically 60 to 120° C. and more often 60 to 95° C.

Another type of food product which derives great benefits from the present invention is fruit juice and acidic drinks. Benefits are also derived for processed fruit, low pH sauces, such as ketchups and purees, salsa sauces, condiments, dips, pickles, etc, alcoholic drinks such as wine or beer and the like. These liquid products may contain fat (acidified fruit milk drinks, etc). They may be pasteurised. The combination of pasteurisation at low pH, but more importantly acid pH and ambient temperature storage results in degradation of non-protected antimicrobial material. If post-processing contamination with yeasts or moulds has occurred, or heat-resistant mould spores (e.g. *Byssochlamys, Talaryomyces*) or yeast ascospores survive the processing, fungal growth will occur once antimicrobial material levels are degraded. Animal feed products such as dog and cat food or broiler feed is often heat processed during the production thereof and then stored at ambient temperature. The encapsulated heat-stable antimicrobial material of the present invention can conveniently be used to protect such feed products.

In liquid products such as juices or wines, the shell material should preferably be made of a material which does not disturb the clarity of the liquid.

When the antimicrobial material is added in the form of the novel capsules of the present invention, the shell will slowly dose out small amounts of antimicrobial material and keep the liquid products free of microbial, such as fungal, growth for extended periods (3-9 months) of storage at ambient temperature. The encapsulation provides a special benefit for heat-treated acidic liquids since the shell protects the antimicrobial material both from heat and acid attack.

Antimicrobial material is a preservative which may also be used to advantage in bakery products. Most baked goods are susceptible to mould spoilage due to aerial contamination with mould spores after baking. Propionate is commonly incorporated into bread and other yeast-leavened doughs as an anti-mould agent. The anti-yeast activity of propionate is much weaker compared to its anti-mould activity in these doughs. Although propionate has a slight inhibitory effect against the bakers' yeast, this is acceptable.

Antimicrobial material cannot be used in this way because it is strongly active against both yeasts and moulds. Encapsulation of the antimicrobial material prevents the antimicrobial material activity against the bakers' yeast until after the leavening is complete. It also protects the antimicrobial material during the baking process. This is particularly useful for products such as sliced breads that have a large surface area exposed to air contamination.

In one preferred aspect the foodstuff is selected from raw meat, cooked meat, raw poultry products, cooked poultry products, raw seafood products, cooked seafood products [raw or cooked meat, poultry and seafood products] and raw or cooked foodstuffs prone to surface bacterial growth.

In one preferred aspect the foodstuff is raw meat.

In one preferred aspect the foodstuff is selected from raw meat products, cooked meat products, raw seafood products, cooked seafood products, raw poultry products and cooked poultry products.

In one preferred aspect the foodstuff is selected from raw poultry products and cooked poultry products.

In one preferred aspect the foodstuff is a raw poultry product.

In one preferred aspect the foodstuff comprises whole meat muscle.

It will be appreciated by one skilled in the art that by the term "cooked" product it is meant a food product which has undergone some degree of cooking (either partial or complete). It will appreciated by one skilled in the art that the cooked products of the present invention may be subjected to further cooking after contacting with the encapsulated material of the present invention. In one preferred aspect the cooked products of the present invention are subjected to further cooking after contacting with the encapsulated material of the present invention. This subsequent cooking provides for release of the antimicrobial material from the encapsulated product and consequently activation of the antimicrobial material protective effect.

Additional Components

The encapsulated anti-microbial material may contain one or more components in addition to the core of an anti-microbial material and the shell of encapsulating material. These one or more additional components may or may not be encapsulated within or by the shell together with the anti-microbial material. In other words the additional components may be encapsulated within or by the shell together with the anti-microbial material or may be "outside" the shell. When one or more additional components are provided a combination of the above is envisaged (one component may be within the shell and another component outside the shell).

Typically the encapsulated antimicrobial material will not be introduced into or onto the foodstuff alone. Thus in one aspect the encapsulated antimicrobial material is introduced into or onto the foodstuff in a carrier. Preferably the carrier is or comprises brine.

The density of the encapsulated antimicrobial material should match the density of the carrier (such as brine) to avoid separation or sedimentation of the encapsulated antimicrobial material, preventing even distribution of encapsulated antimicrobial material during injection or tumbling. Thus in a preferred aspect the carrier and the encapsulated antimicrobial material have substantially the same density.

Matching the density of the carrier and the encapsulated antimicrobial material may be achieved by careful selection of carrier and encapsulated antimicrobial material. Alternatively it may be achieved by modification of the encapsulated antimicrobial material to have substantially the same density as the carrier, or by modification of the carrier to have substantially the same density as the encapsulated antimicrobial material. The encapsulated antimicrobial material may be modified by contacting the encapsulated antimicrobial material with oil, such as a brominated oil. The carrier may be modified by inclusion of an additional component such as xanthum gum.

The carrier may contain one or more additional components. However, in some aspects the carrier contains no additional components or contains no additional components that materially affect the properties of the composition.

In one preferred aspect the carrier further comprises an emulsifier. Preferably the emulsifier is selected from polyoxy-ethylene sorbitan esters (E432-E436) otherwise known as polysorbates (e.g. Tween 80, Tween 20), monoglycerides, diglycerides, acetic acid esters of mono-diglycerides, tartaric acid esters of mono-diglycerides and citric acid esters of mono-diglycerides.

The encapsulated antimicrobial material may contain one or more additional components. However, in some aspects the encapsulated antimicrobial material contains no additional components or contains no additional components that materially affect the properties of the composition.

In one preferred aspect the encapsulated antimicrobial material further comprises an extract obtained from or obtainable from a plant of the Labiatae family. Optionally in this aspect and particularly when the antimicrobial material consists of nisin, the composition comprises carvacrol in an amount of less than 0.075 wt. % based on the composition and carvone in an amount of less than 15 wt. % based on the composition. Compositions comprising an antimicrobial material and an extract obtained from or obtainable from a plant of the Labiatae family are discussed in our British Patent Application No. 0323335.0 Each of the teachings of GB 0323335.0 are applicable to the present system.

In this aspect preferably the extract obtained from or obtainable from a plant of the Labiatae family is not encapsulated within or by the shell together with the anti-microbial material.

In one preferred aspect the extract contains carvacrol in an amount of less than 0.075 wt. % based on the composition, preferably in an amount of less than 0.04 wt. % based on the composition, more preferably in an amount of less than 0.02 wt. % based on the composition.

In one preferred aspect the extract contains carvone in an amount of less than 0.075 wt. % based on the composition, preferably in an amount of less than 0.04 wt. % based on the composition, more preferably in an amount of less than 0.02 wt. % based on the composition.

In one preferred aspect the extract contains thymol in an amount of less than 0.1 wt. % based on the composition, preferably in an amount of less than 0.075 wt. % based on the composition, more preferably in an amount of less than 0.0 wt. % based on the composition.

In one aspect the extract used is obtained from a plant of the Labiatae family.

It will be appreciated by one skilled in the art that by the term "extract" or "extracts" it is meant any constituent of the plant which may be isolated from the whole plant.

In one aspect the extract used in the present invention is obtainable from a plant of the Labiatae family. It will be appreciated by one skilled in the art that an extract obtainable from a plant may be obtained from a plant or may be isolated from the plant, identified and then obtained from an alternative source, for example by chemical synthesis or enzymatic production. For example the extract may be produced by a eukaryotic or prokaryotic fermentation, by a process of genetic manipulation. The present applicant have recognised that products present in a plant of the Labiatae family may synergistically increase the activity of a an antimicrobial material, preferably a bacteriocin. These products may be obtained from any source and will fall within the scope of the present invention.

The invention comprises use of a combination of a antimicrobial material, for example a bacteriocin and in particular nisin, and of the Labiatae plant family, such as rosemary (*Rosmarinus officinalis*) or sage (*Salvia officinalis*) that together give enhanced control of Gram-positive bacteria in a food system. The extracts responsible for synergy in the present invention preferably refer to extracts of the plant family Labiatae that have been selectively extracted ("deodorised extracts") to increase their phenolic diterpene content (such as carnosol and carnosic acid), phenolic tripterpene content (such as ursolic acid, betulinic acid and oleanolic acid) or rosmarinic acid content. These deodorised extracts can be distinguished by their high phenolic diterpene content (for example greater than 3.5 wt. %) and their low level (less than 1 wt. %) of flavour-inducing compounds from plant essential oils and oleoresins that are used as flavours or fragrances. Essential oils are typically extracted by simple steam distillation of the plant material.

In one preferred aspect the extract is a deodorised extract. Preferably the (deodorised) extract contains from 1.0 to 70 wt. % phenolic diterpenes, preferably 3.5 to 70 wt. % phenolic diterpenes and less than 1 wt. % essential oil.

In one preferred aspect the extract is selected from phenolic diterpenes, phenolic triterpenes and rosmarinic acid.

In one preferred aspect the extract is or comprises a phenolic diterpene. Preferably the phenolic diterpene is selected from carnosic acid, carnosol, methylcarnosic acid and mixtures thereof. Preferably the phenolic diterpene is selected from carnosic acid and carnosol.

In one preferred aspect the extract contains phenolic diterpenes in an amount of greater than 1.0 wt. %, based on the composition, preferably in an amount of is greater than 2.0 wt. %, based on the composition, more preferably in an amount of is greater than 3.0 wt. %, based on the composition, more preferably in an amount of is greater than 3.5 wt. %, based on the composition.

In one highly preferred aspect the extract contains one or more phenolic triterpenes. Preferably the phenolic triterpenes are selected from betulinic acid, oleanolic acid, and ursolic acid.

In one preferred aspect is or comprises a phenolic triterpene. Preferably the phenolic triterpene is selected from betulinic acid, oleanolic acid, and ursolic acid.

In one preferred aspect the extract is or comprises rosmarinic acid.

In one preferred aspect the plant of the Labiatae family is selected from rosemary, sage, oregano, marjoram, mint, balm, savoury and thyme. In one preferred aspect the plant of the Labiatae family is selected from rosemary, sage, oregano, marjoram, mint, balm, and savoury. It will be understood that these name cover all species and varieties of plants known by these names.

In one preferred aspect the plant of the Labiatae family is selected from rosemary (*Rosmarinus officinalis* L.), sage (*Salvia officinalis* L.) oregano (*Origanum vulgare* L.), marjoram (*Origanum marjorana* L.), mint (*Mentha* spp.), balm (*Melissa officinalis* L.), savoury (*Satureia hortensis*), and thyme (*Thymus vulgaris* L.).

In one preferred aspect the plant of the Labiatae family is selected from rosemary (*Rosmarinus officinalis* L.), sage (*Salvia officinalis* L.) oregano (*Origanum vulgare* L.), marjoram (*Origanum marjorana* L.), mint (*Mentha* spp.), balm (*Melissa officinalis* L.), and savoury (*Satureia hortensis*).

In one preferred aspect the plant of the Labiatae family is rosemary.

In one preferred aspect the extract contains flavour-inducing compounds and/or essential oils in an amount of less than 1 wt. % based on the extract. In one preferred aspect the extract contains flavour-inducing compounds and/or essential oils in an amount of less than 1 wt. % based on the composition.

Typically flavour-inducing compounds and/or essential oils are camphor, verbenone, borneol and alfa-terpineol.

In one preferred aspect the combined amount of camphor present in the extract is less than 1 wt. % (preferably less than 0.2 wt. %, more preferably less than 0.15 wt. %, more preferably less than 0.1 wt. %) based on the extract.

In one preferred aspect the combined amount of verbenone present in the extract is less than 1 wt. % (preferably less than 0.2 wt. %, more preferably less than 0.15 wt. %, more preferably less than 0.1 wt. %) based on the extract.

In one preferred aspect the combined amount of borneol present in the extract is less than 1 wt. % (preferably less than 0.2 wt. %, more preferably less than 0.15 wt. %, more preferably less than 0.1 wt. %) based on the extract.

In one preferred aspect the combined amount of alfa-terpineol present in the extract is less than 1 wt. % (preferably less than 0.2 wt. %, more preferably less than 0.15 wt. %, more preferably less than 0.1 wt. %) based on the extract.

In one preferred aspect the combined amount of camphor, verbenone, borneol and alfa-terpineol present in the extract is less than 1 wt. % (preferably less than 0.2 wt. %, more preferably less than 0.15 wt. %, more preferably less than 0.1 wt. %) based on the extract.

In one preferred aspect the encapsulated antimicrobial material further comprises a chelator. Preferably the chelator is selected from EDTA, citric acid, monophosphates, diphosphates, triphosphates and polyphosphates.

Further suitable chelator are taught in U.S. Pat. No. 5,573,801 and include carboxylic acids, polycarboxylic acids, amino acids and phosphates. In particular, the following compounds and their salts may be useful:

Acetic acid, Adenine, Adipic acid, ADP, Alanine, B-Alanine, Albumin, Arginine, Ascorbic acid, Asparagine, Aspartic acid, ATP, Benzoic acid, n-Butyric acid, Casein, Citraconic acid, Citric acid, Cysteine, Dehydracetic acid, Desferri-ferrichrysin, Desferri-ferrichrome, Desferri-ferrioxamin E, 3,4-Dihydroxybenzoic acid, Diethylenetriaminepentaacetic acid (DTPA), Dimethylglyoxime, O,O-Dimethylpurpurogallin, EDTA, Formic acid, Fumaric acid, Globulin, Gluconic acid, Glutamic acid, Glutaric acid, Glycine, Glycolic acid, Glycylglycine, Glycylsarcosine, Guanosine, Histamine, Histidine, 3-Hydroxyflavone, Inosine, Inosine triphosphate, Iron-free ferrichrome, Isovaleric acid, Itaconic acid, Kojic acid, Lactic acid, Leucine, Lysine, Maleic acid, Malic acid, Methionine, Methylsalicylate, Nitrilotriacetic acid (NTA), Ornithine, Orthophosphate, Oxalic acid, Oxystearin, B-Phenylalanine, Phosphoric acid, Phytate, Pimelic acid, Pivalic acid, Polyphosphate, Proline, Propionic acid, Purine, Pyrophosphate, Pyruvic acid, Riboflavin, Salicylaldehyde, Salicyclic acid, Sarcosine, Serine, Sorbitol, Succinic acid, Tartaric acid, Tetrametaphosphate, Thiosulfate, Threonine, Trimetaphosphate, Triphosphate, Tryptophan, Uridine diphosphate, Uridine triphosphate, n-Valeric acid, Valine, and Xanthosine.

Many of the above sequestering agents are useful in food processing in their salt forms, which are commonly alkali metal or alkaline earth salts such as sodium, potassium or calcium or quaternary ammonium salts. Sequestering compounds with multiple valencies may be beneficially utilised to adjust pH or selectively introduce or abstract metal ions e.g. in a food system coating. Additional information chelators is disclosed in T. E. Furia (Ed.), CRC Handbook of Food Additives, 2nd Ed., pp. 271-294 (1972, Chemical Rubber Co.), and M. S. Peterson and A. M. Johnson (Eds.), Encyclopaedia of Food Science, pp. 694-699 (1978, AVI Publishing Company, Inc.) which articles are both hereby incorporated by reference.

The terms "chelator" is defined as organic or inorganic compounds capable of forming co-ordination complexes with metals. Also, as the term "chelator" is used herein, it includes molecular encapsulating compounds such as cyclodextrin. The chelator may be inorganic or organic, but preferably is organic.

Preferred chelator are non-toxic to mammals and include aminopolycarboxylic acids and their salts such as ethylenediaminetetraacetic acid (EDTA) or its salts (particularly its di- and tri-sodium salts), and hydrocarboxylic acids and their salts such as citric acid. However, non-citric acid and non-citrate hydrocarboxylic acid chelators are also believed useful in the present invention such as acetic acid, formic acid, lactic acid, tartaric acid and their salts.

As noted above, the term "chelator" is defined and used herein as a synonym for sequestering agent and is also defined as including molecular encapsulating compounds such as cyclodextrin. Cyclodextrins are cyclic carbohydrate molecules having six, seven, or eight glucose monomers arranged in a donut shaped ring, which are denoted alpha, beta or gamma cyclodextrin, respectively. As used herein, cyclodextrin refers to both unmodified and modified cyclodextrin monomers and polymers. Cyclodextrin molecular encapsulators are commercially available from American Maize-Products of Hammond, Ind. Cyclodextrin are further described in Chapter 11 entitled, "Industrial Applications of Cyclodextrin", by J. Szejtli, page 331-390 of Inclusion Compounds, Vol. III (Academic Press, 1984) which chapter is hereby incorporated by reference. When the anti-microbial material is natamycin, cyclodextrins are particularly preferred. Cyclodextrins improve the solubility of natamycin.

Preferably the chelator enhances the antimicrobial activity and/or antimicrobial spectrum of the bacteriocin. More preferably the chelator enhances the antimicrobial activity and/or antimicrobial spectrum of the bacteriocin in respect of Gram-negative bacteria and other micro-organisms.

We have found that the provision of a chelator is particularly effective in view of the enhancement of the antimicrobial activity and/or antimicrobial spectrum of the bacteriocin provided. This enhancement is possible irrespective of the manner in which the encapsulated antimicrobial material is delivered or the nature of the shell of the encapsulated antimicrobial material.

Thus in a further aspect the present invention provides an antimicrobial material in an encapsulated form, comprising (a) a core of (i) an antimicrobial material and (ii) a chelator; and (b) a shell of encapsulating material.

In one preferred aspect the encapsulated antimicrobial material further comprises an organic acid, a salt thereof or a mixture thereof. Particularly preferred organic acids are lactic acid and acetic acid. Preferably the organic acids are provided in their salt form such as the sodium salt or potassium salt of the respective acid. Highly preferred organic acid salts are sodium lactate (L-sodium lactate), potassium lactate (L-potassium lactate), sodium di-acetate and mixtures thereof. Particularly preferred mixtures are mixtures of sodium lactate (L-sodium lactate) and sodium di-acetate; and mixtures of sodium lactate and potassium lactate. Suitable salts of organic acids (and mixtures thereof) are available from Purac, Netherlands under the name PURASAL®.

Each of the preferred aspects described herein are applicable to this aspect of the invention. Particularly preferred aspects include wherein the shell of encapsulating material is impermeable to the antimicrobial material.

the shell is selected to provide sustained release of the antimicrobial material from the encapsulated antimicrobial material.

the shell is selected to prevent, reduce or inhibit degeneration or inactivation of the antimicrobial material.

the chelator enhances the antimicrobial activity and/or antimicrobial spectrum of the bacteriocin the chelator enhances the antimicrobial activity and/or antimicrobial spectrum of the bacteriocin in respect of Gram-negative bacteria and other micro-organisms.

the chelator is selected from EDTA, citric acid, monophosphates, diphosphates, triphosphates and polyphosphates.

the antimicrobial material is an antibacterial material.

the antimicrobial material is a bacteriocin.

the antimicrobial material is at least nisin.

the antimicrobial material is an antifungal material.

the antimicrobial material is at least natamycin.

Process

The encapsulated antimicrobial material may be introduced into or onto the foodstuff by any suitable method. For example it may be introduced into or onto the foodstuff by spraying, dipping injecting, tumbling, or mixing (into the matrix of the foodstuff).

The encapsulated antimicrobial material may be introduced into or onto the foodstuff by (a) injecting the encapsulated antimicrobial material into the foodstuff or (b) tumbling the encapsulated antimicrobial material with the foodstuff.

In one aspect the encapsulated antimicrobial material is introduced into the foodstuff by injecting the encapsulated antimicrobial material into the foodstuff.

In one aspect the encapsulated antimicrobial material is introduced into or onto the foodstuff by tumbling the encapsulated antimicrobial material with the foodstuff.

As noted herein the encapsulated antimicrobial material may be introduced into or onto the foodstuff by means other than injection or tumbling. For example the encapsulated antimicrobial material may be incorporated in a marinade. Marinated meat can be prepared in two ways: 1) a surface treatment (such as, for example but not limited to, adding the marinade to the raw meat followed by gas or vacuum packing) or 2) forceful incorporation on the marinade/brine by physical means (such as, for example but not limited to, tumbling or injection).

Teachings on the practice of injection into foodstuffs or tumbling of foodstuffs can be found in WO 00/62632.

Further Aspects

Further aspects of the present invention will be described in the following numbered paragraphs:

1. A antimicrobial material (preferably natamycin) dosage form comprising microcapsules where antimicrobial material (preferably natamycin) is encapsulated within a physiologically acceptable shell to provide a protected food preservative antimicrobial material (preferably natamycin) product.

2. A antimicrobial material (preferably natamycin) dosage form according to paragraph 1, wherein said shell is effective in substantially retaining said antimicrobial material (preferably natamycin) within said shell during processing of said food product.

3. A antimicrobial material (preferably natamycin) dosage form according to paragraph 1, wherein said shell is effective in providing slow or delayed release of said encapsulated antimicrobial material (preferably natamycin) into said food product.

4. A antimicrobial material (preferably natamycin) dosage form according to paragraph 1, wherein said shell is effective in protecting said encapsulated antimicrobial material (preferably natamycin) from degradation by conditions prevailing in the production of a product whereto said encapsulated antimicrobial material (preferably natamycin) is added and in providing release of antimicrobial material (preferably natamycin) in said finished product.

5. A antimicrobial material (preferably natamycin) dosage form according to paragraph 1, wherein said encapsulation is provided by a process selected from a fluidized bed process, liposome encapsulation, spray drying, spray cooling, extrusion, co-extrusion, coacervation and combinations thereof.

6. A antimicrobial material (preferably natamycin) dosage form according to paragraph 1 wherein said shell is made of a material selected from the group consisting of hydrophobic materials, hydrocolloid materials and mixtures or combinations thereof.

7. A antimicrobial material (preferably natamycin) dosage form according to paragraph 6 wherein said hydrophobic material is chosen from lipids and resins including fatty acids, fats, oils, emulsifiers, fatty alcohols, waxes and mixtures or combinations thereof.

8. A antimicrobial material (preferably natamycin) dosage form according to paragraph 7, wherein said hydrophobic material is selected from the group consisting of food grade animal oils and fats, fully hydrogenated vegetable or animal oils, partially hydrogenated vegetable or animal oils, unsaturated, hydrogenated or fully hydrogenated fatty acids, unsaturated, partially hydrogenated or fully hydrogenated fatty acid monoglycerides and diglycerides, unsaturated, partially hydrogenated or fully hydrogenated esterified fatty acids of monoglycerides or diglycerides, unsaturated, partially hydrogenated or fully hydrogenated free fatty acids, other emulsifiers, animal waxes, vegetable waxes, mineral waxes, synthetic waxes, natural and synthetic resins and mixtures thereof.

9. A antimicrobial material (preferably natamycin) dosage form according to paragraph 6 wherein said hydrocolloid comprises a soluble or dispersible coating material selected from food grade gums, polysaccharides, proteins, shellac and mixtures or combinations thereof.

10. A antimicrobial material (preferably natamycin) dosage form according to paragraph 9, wherein said hydrocolloid is selected from cellulosic derivatives including hydroxy propyl methyl cellulose, cellulose acetate phthalate, carboxy methyl cellulose, methyl cellulose and microcrystalline cellulose, sodium alginate, gum arabic, gellan gum, guar gum, agar gum, pectin, amidified pectin, carrageenan, gelatine, chitosan, mesquite gum, hyaluronic acid, methyl acrylic copolymers, such as Eudragit®, psyllium, tamarind, xanthan, locust bean gum, wellan gum, zein, shellac, whey protein, soy protein, sodium caseinate, synthetic or natural water-soluble polysaccharides, proteins and other hydrocolloids, with or without fatty acids, fatty alcohol, plasticizers including glycerol, polyethyleneglycol and other low molecular weight hydrophilic alcohols, or combinations of any of said hydrocolloids.

11. A antimicrobial material (preferably natamycin) dosage form according to paragraph 1 wherein said shell is provided by co-processing antimicrobial material (preferably natamycin) with an encapsulating material, which is in an aqueous or lipidic solution or suspension or in a molten state.

12. A antimicrobial material (preferably natamycin) dosage form according to paragraph 11 wherein said antimicrobial material (preferably natamycin) is an aqueous suspension or comprises a dry powder.

13. A antimicrobial material (preferably natamycin) dosage form according to paragraph 1, which comprises microcapsules having a solidified hydrophobic shell matrix, encapsulated aqueous beads which are further encapsulated in the solidified hydrophobic shell matrix, and antimicrobial material (preferably natamycin) incorporated in the encapsulated aqueous beads.

14. A antimicrobial material (preferably natamycin) dosage form according to paragraph 1, wherein the percentage of active antimicrobial material (preferably natamycin) in said protected antimicrobial material (preferably natamycin) product is from 1 to 80% by weight.

15. A antimicrobial material (preferably natamycin) dosage form according to paragraph 14, wherein said percentage is between 15 and 50% by weight.

16. A antimicrobial material (preferably natamycin) dosage form according to paragraph 15, wherein said percentage is between 30 and 40% by weight.

17. A process for preparing a antimicrobial material (preferably natamycin) dosage form comprising (i) co-processing antimicrobial material (preferably natamycin) with a physiologically acceptable encapsulating material to cause said material to encapsulate said antimicrobial material (preferably natamycin) within a shell, and (ii) recovering a protected food preservative antimicrobial material (preferably natamycin) product.

18. A process according to paragraph 17, wherein said encapsulation process is selected from a fluidized bed process, liposome encapsulation, spray drying, spray cooling, extrusion, co-extrusion, coacervation and mixtures thereof.

19. A process according to paragraph 17 wherein said encapsulating material comprises a material selected from the group consisting of hydrophobic materials, hydrocolloid materials and mixtures or combinations thereof, 20. A process according to paragraph 17, wherein said encapsulation process comprises fluidized bed encapsulation of antimicrobial material (preferably natamycin) with an encapsulating material in an aqueous solution or suspension or in a molten state.

21. A process according to paragraph 17, wherein said encapsulation process comprises coacervation of antimicrobial material (preferably natamycin) with an encapsulating material.

22. A process according to paragraph 19, wherein said encapsulating material comprises a hydrocolloid or a mixture of hydrocolloids.

23. A process according to paragraph 17, which includes the steps of
a) providing an aqueous phase and antimicrobial material (preferably natamycin) incorporated in the aqueous phase,
b) providing a hydrophobic phase in a molten form,
c) incorporating or dissolving an encapsulating material or mixture of encapsulating materials in the aqueous phase or in the hydrophobic phase
d) combining the aqueous phase with the hydrophobic phase and homogenizing or mixing the combined phases to form a water-in-oil emulsion,
e) encapsulating the aqueous phase in the emulsion, whereby a dispersion comprising encapsulated aqueous beads is formed and the antimicrobial material (preferably natamycin) is encapsulated in the aqueous beads, and
f) processing the dispersion obtained in step e) to form microcapsules where the encapsulated aqueous beads are further encapsulated in solidified hydrophobic shell material.

24. A method for the preservation of a food product comprising adding to said food product an effective food-preserving amount of antimicrobial material (preferably natamycin) which is encapsulated within a physiologically acceptable shell.

25. A method according to paragraph 24, wherein said encapsulated antimicrobial material (preferably natamycin) is added to said food product prior to or in connection with the production of said food product and said shell is effective in protecting said encapsulated antimicrobial material (preferably natamycin) from degradation by conditions used in the production or storage of said food product said shell providing release of antimicrobial material (preferably natamycin) in said food product.

27. A method according to paragraph 24 wherein said food product is selected from a salad dressing, a condiment, a ketchup, puree, a salsa sauce, a pickle, a dip, an acidic dairy product including natural cheese, cottage cheese, acidified cheese, cream cheese, yoghurt, sour cream and processed cheese, a fruit juice, an acidic drink, an alcoholic drink including wine and beer, a chilled dough, a cooked or uncooked bakery product, a dairy filling or topping, a surface glaze or coating a marinade, marinated or breaded meat or poultry, a pizza topping or base, a fast food product, a kit for making a snack or a meal, a kit for making a bakery product, combinations thereof, pet food and broiler feed.

28. A method according to paragraph 24 wherein said encapsulated antimicrobial material (preferably natamycin) is included in a dough for a yeast-leavened or non-yeast-leavened bakery product.

29. A method according to paragraph 28, wherein said dough is baked into bread and subsequently sliced.

30. A preserved food product which comprises as a preservative an effective food preserving amount of antimicrobial material (preferably natamycin) which is encapsulated within a physiologically acceptable shell.

31. A food product according to paragraph 30 wherein said food product is selected from a salad dressing, a condiment, a ketchup, a puree, a salsa sauce, a pickle, a dip, an acidic dairy product including natural cheese, cottage cheese, acidified cheese, cream cheese, yoghurt, sour cream and processed cheese, a fruit juice, an acidic drink, an alcoholic drink, a chilled dough, a cooked or uncooked bakery product, a dairy filling or topping, a surface glaze or coating, a marinade, marinated meat or poultry, breaded meat or poultry, a pizza topping or base, a fast food product, a kit for making a snack or meal, a kit for making a bakery product, combinations thereof, pet food and broiler feed.

32. A food product according to paragraph 31 wherein said bakery product is sliced or cut bread.

Highly Preferred Aspects

Some highly preferred aspects of the present invention are set out below a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the encapsulated nisin has an average particle size of less than 150 μm.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the shell is or comprises a material selected from triglyceride and carrageenan.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the foodstuff is raw meat.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin has an average particle size of less than 150 μm.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the shell is or comprises a material selected from triglyceride and carrageenan.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus, Listeria monocytogenes, Bacillus, Clostridium*; and *Brochothrix thermosphacta*, wherein the foodstuff is raw meat.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus,*

*Clostridium*; and *Brochothrix thermosphacta*, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the encapsulated nisin has an average particle size of less than 150 μm, wherein the shell is or comprises a material selected from triglyceride and carrageenan.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the encapsulated nisin has an average particle size of less than 150 μm, wherein the foodstuff is raw meat.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the encapsulated nisin has an average particle size of less than 150 μm, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the shell is or comprises a material selected from triglyceride and carrageenan, wherein the foodstuff is raw meat.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the shell is or comprises a material selected from triglyceride and carrageenan, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the foodstuff is raw meat, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the foodstuff is raw meat, wherein the encapsulated nisin has an average particle size of less than 150 μm.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the foodstuff is raw meat, wherein the shell is or comprises a material selected from triglyceride and carrageenan.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the foodstuff is raw meat, wherein the encapsulated nisin is introduced into or onto the foodstuff in a brine carrier.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin is introduced into or onto the foodstuff in a brine carrier, wherein the encapsulated nisin has an average particle size of less than 150 μm.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin is introduced into or onto the foodstuff in a brine carrier, wherein the shell is or comprises a material selected from triglyceride and carrageenan.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin is introduced into or onto the foodstuff in a brine carrier, wherein the foodstuff is raw meat.

a process for introducing an antimicrobial material into a foodstuff comprising (i) providing nisin in an encapsulated form comprising a core of nisin and shell of encapsulating material, and (ii) introducing encapsulated nisin into or onto the foodstuff by (a) injecting the encapsulated nisin into the foodstuff or (b) tumbling the encapsulated nisin with the foodstuff, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin has an average particle size of less than 150 µm, wherein the shell is or comprises a material selected from triglyceride and carrageenan, wherein the foodstuff is raw meat, wherein the encapsulated nisin is introduced into or onto the foodstuff in a brine carrier.

an antimicrobial material in an encapsulated form, comprising a core of nisin and shell of encapsulating material, wherein the shell of encapsulating material is impermeable to nisin an antimicrobial material in an encapsulated form, comprising a core of nisin and shell of encapsulating material, wherein the shell of encapsulating material is impermeable to nisin, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*.

an antimicrobial material in an encapsulated form, comprising a core of nisin and shell of encapsulating material, wherein the shell of encapsulating material is impermeable to nisin, wherein the encapsulated nisin has an average particle size of less than 150 µm.

an antimicrobial material in an encapsulated form, comprising a core of nisin and shell of encapsulating material, wherein the shell of encapsulating material is impermeable to nisin, wherein the shell is or comprises a material selected from triglyceride and carrageenan.

an antimicrobial material in an encapsulated form, comprising a core of nisin and shell of encapsulating material, wherein the shell of encapsulating material is impermeable to nisin, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the encapsulated nisin has an average particle size of less than 150 µm.

an antimicrobial material in an encapsulated form, comprising a core of nisin and shell of encapsulating material, wherein the shell of encapsulating material is impermeable to nisin, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the shell is or comprises a material selected from triglyceride and carrageenan.

an antimicrobial material in an encapsulated form, comprising a core of nisin and shell of encapsulating material, wherein the shell of encapsulating material is impermeable to nisin, wherein the encapsulated nisin has an average particle size of less than 150 µm, wherein the shell is or comprises a material selected from triglyceride and carrageenan.

an antimicrobial material in an encapsulated form, comprising a core of nisin and shell of encapsulating material, wherein the shell of encapsulating material is impermeable to nisin, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the foodstuff is raw meat, wherein the encapsulated nisin has an average particle size of less than 150 µm.

an antimicrobial material in an encapsulated form, comprising a core of nisin and shell of encapsulating material, wherein the shell of encapsulating material is impermeable to nisin, wherein the nisin is present in an amount to provide a microbicidal or microbiostatic effect in respect of a micro-organism selected from *Lactobacillus, Leuconostoc, Carnobacterium, Enterococcus; Listeria monocytogenes, Bacillus, Clostridium*; and *Brochothrix thermosphacta*, wherein the foodstuff is raw meat, wherein the shell is or comprises a material selected from triglyceride and carrageenan.

The present invention will now be described in further detail in the following examples.

EXAMPLES

Nisin

Example 1

First, a solution of 15 g k-carrageenan in 1000 mL of phosphate buffer at pH 3.5 is prepared at 85° C. To this is added 300 g of Nisaplin® (Danisco commercial extract of nisin: equivalent to 1×10$^6$ IU/g nisin potency). The resulting mixture is thoroughly mixed. At the same time, a mixture of 1333 g of a vegetable triglyceride (Danisco: GRINSTED® PS 101, m.p. 58° C.) and 73 g of acetylated emulsifier (Danisco: Acetem 50 00) is melted at 85° C. in a water bath. The melted fat mixture is kept under homogenisation (Silverson mixer, 8 kRPM) as the aqueous mixture is slowly incorporated. The homogenisation is maintained for 5 minutes after the whole aqueous mixture is added and then a solution of 3 g of polysorbate 80 in 40 mL of water is added under constant mixing. The resulting low-viscosity water-in-oil emulsion is then immediately spray cooled in a Niro spray tower using the following parameters: inlet air temperature: 10° C., outlet air temperature 28° C., rotating atomization wheel speed: 10 kPRM. A free flowing powder is obtained.

This encapsulated nisin can be used for injection or tumbling of raw meat that is then immediately cooked. Nisin release from the fat shell would occur upon injection and/or cooking. Since the fat-based encapsulated shell material would make the particles float to the surface of the injection brine, either a) a viscosifying agent such as xanthan could be used to stabilise the particles in the brine, or b) to mix the brine before use as an injection material. Mixing of the particles would naturally occur when encapsulated nisin is used in the brine used for tumbling of meat.

The same encapsulated material can be used for sustained release at chilled temperature of encapsulated nisin within marinades used on vacuum-packaged, chilled raw meat.

Example 2

First, a solution of 15 g sodium alginate in 1000 mL of phosphate buffer at pH 3.5 is prepared at 85° C. To this is added 300 g of Nisaplin® (Danisco commercial extract of nisin: equivalent to $1 \times 10^6$ IU/g nisin potency). The resulting mixture is thoroughly mixed. At the same time, a mixture of 1333 g of a vegetable triglyceride (Danisco: GRINSTED® PS 101, melting point 58° C.) and 73 g of acetylated emulsifier (Danisco: Acetem 50 00) is melted at 85° C. in a water bath. The melted fat mixture is kept under homogenization (Silverson mixer, 8 kRPM) as the aqueous mixture is slowly incorporated. Following the incorporation of the aqueous mixture, a solution of 7 g of calcium chloride in 70 mL of water is added dropwise. The homogenization is maintained for another 5 minutes and then a solution of 3 g of polysorbate 80 in 40 mL of water is added under constant mixing. The resulting low-viscosity water-in-oil emulsion is then immediately spray cooled in a Niro spray tower using the following parameters: inlet air temperature: 10° C., outlet air temperature 28° C., rotating atomization wheel speed: 10 kPRM. A free flowing powder is obtained.

The use of this encapsulated nisin is as described in Example 1.

Example 3

A solution of 1 g of a bilayer-forming lipid and 100 mg of cholesterol in a suitable organic solvent is evaporated so as to form a thin dry lipid film on the bottom of the container. After thorough drying of the lipid film, 1 L of water containing nisin (as Nisaplin®) at the saturation concentration is added to the container and the mixture is thoroughly mixed or homogenized. The resulting suspension of multilamellar vesicle (MLV) can be further processed by microfluidization to form smaller more homogenous small unilamellar vesicle (SUV). The suspension of liposome-encapsulated nisin can be added directly to the meat by injection/tumbling.

These particles are small enough to pass through injection needles without disintegration of the liposome shell. The liposome-encapsulated nisin would be released on cooking since liposomes break up at 45-50° C. because of the transition temperature of bilayer-forming phospholipids/amphiphilic compounds. Lipsome-encapsulated nisin would be slowly released over time, thus making it suitable for sustained release in raw meat marinades.

Liposome-encapsulated nisin can be made by several processes, including microfluidization, extrusion, 'French press', reverse phase evaporation, freeze-thaw cycle, etc. Microfluidization, is the preferred aspect since it is a continuous, high capacity and solvent-free process.

Example 4

Use of a fluidised bed to apply a hydrophobic shell onto the nisin. If the nisin particle size is too fine, the powder can be agglomerated in an suitable equipment using a binder solution (solution of sticky hydrocolloids such as alginate or maltodextrin) in order to obtain a dense powder of particle size between 100-150 micrometres. The appropriate powder is then introduced into the coating chamber of a fluidized-bed microencapsulation unit and fluidized at inlet air flow rate of 5-30 cm/s and temperature up to 50° C. to fluidized the particles. A coating material is then sprayed onto the fluidized bed of antimicrobial using a double fluid nozzle and high pressure atomization air.

In one example, a melted mixture of triglyceride and additives is sprayed onto the nisin to form a continuous layer of fat around each individual particle as the melted fat spread and solidifies on the particles. The amount of fat applied can be up to 50%, but no usually no lower than 20% w/w.

In another example, a dispersion of coating material in water or a solution of coating material in ethanol is sprayed onto the fluidized particles and the fluidization air is used to evaporate the solvent or the water, which leaves behind a continuous film of coating material on the antimicrobial particles. Examples of coating material in this case include shellac, zein or any other hydrophobic coating materials.

In order for encapsulated nisin prepared by this method to used for raw meat injection, the particles size must be less than 175 micrometres. In addition, the particle size must be greater than 100 micrometres for the fluidization process to work.

Example 5

Enhanced Antilisterial Effect with Encapsulated Nisin in Hot Dogs

Encapsulated Nisin is prepared by spray crystallization in accordance with the following procedure. Fully hydrogenated triglyceride (GRINSTED PS101, 100 parts) is melted at 85° C. in a water bath. Nisin (64 parts) is pre-heated at 50 C and added to the melted triglyceride, kept at 85° C., under vigorous mixing. Mixing is maintained until the mixture becomes smooth and lump-free. The suspension is then pumped to the atomization device of a spray tower in traced pipes maintained at 75-85° C. The atomization device is a "rotating wheel" at 9000 RPM installed at the top of the spray tower. Cooled (3-5° C.) air is blown in the spray tower so as to crystallize the atomized droplets of fat/nisin before reaching the walls of the tower. The solidified powder is collected at the bottom of the tower. The powder may be kept at 40° C. 2-3 days to allow re-crystallization of the fat phase, if necessary, from the alpha to the beta form. Anti-caking agent, such as calcium stearate or silicon dioxide may be added to a 0.1-1% level to prevent further lumping of the powder.

An inoculation trial with *Listeria monocytogenes* was conducted with hot dogs; this demonstrated the heat-protective benefit of encapsulated nisin.

The formulation of the hot dogs was as follows (raw batch weight basis): 74.1% meat trimmings (lean beef and pork fat), 1.66% NaCl, 1.48% corn syrup solids, 0.74% HMP, 0.37% hydrolysed beef stock, 0.33% sodium tripolyphosphate, 0.37% spice/seasoning mix, 0.037% erythorbate, 0.185 sodium nitrite cure blend, 13.3% added water, 7.4% added water (10%, cook shrink). Nisin was added at 250 and 500 IU/g either as unencapsulated nisin (Nisaplin®, Danisco) or as an encapsulated nisin product. The sausage, which contained 28% fat, then underwent a heating/smoking regime as shown below:

Smokehouse Schedule

| Time (minutes) | Dry bulb (° F.) | Wet bulb (° F.) | Relative humidity (%) | Smoke |
|---|---|---|---|---|
| 30 | 130 | 96 | 29 | Off |
| 15 | 140 | 104 | 30 | On |
| 15 | 150 | 112 | 30 | On |
| 15 | 160 | 120 | 31 | On |
| 15 | 170 | 128 | 31 | On |
| 15 | 180 | 134 | 30 | On |

The sausages were held to an endpoint internal temperature of 160° F., shower cooled to 95° F. then chilled to <40° F. The sausages were vacuum-packed, six to a bag and surface inoculated with a 5 strain cocktail of *Listeria monocytogenes* and *Listeria innocua* (including environmental isolates).

Nisin levels in the hot dogs were measured the following day and during the 12 week storage at 38-40° F. by a bioassay method a horizontal agar diffusion assay method using *Micrococcus luteus* as the indicator organism (Fowler et al. 1975. Society for Applied Bacteriology Technical Series 8: 91-105). This uses an acid/heat extraction step that detects all residual nisin within the samples, even if encapsulated. The hot dogs were also analysed at weekly intervals for counts of *Listeria monocytogenes* and natural contaminant lactic acid bacteria.

The long heat processing resulted in significant nisin loss. Initial nisin levels detected in the hot dogs post-processing were much higher in samples to which encapsulated nisin had been added compared to those with unencapsulated nisin (Nisaplin®, Danisco) (see FIG. 1)

The microbiological data from the trial was subjected to multivariate statistical analysis. This concluded that encapsulation achieved a greater initial drop in *Listeria* numbers. The optimum treatment for achieving a shelf life of 84 days was provided by encapsulated nisin (at 500 IU/g), the secondary optimum treatment was Nisaplin® (at 500 IU/g). This further demonstrated the superior efficacy of the encapsulated nisin.

Example 6

Improved Nisin Levels with Encapsulated Nisin in a Bakery Item

Crumpets are high moisture flour-based bakery products that have been implicated in food poisoning outbreaks due to *Bacillus cereus*. The products are stored at ambient temperature and during the 5-day shelf life, surviving heat-resistant spores of *Bacillus cereus* (present in the flour) may germinate and grow, particularly in countries with warm climates. Nisin has been used as a preservative in crumpets to prevent the growth of this pathogen and ensure consumer safety. The cooking process for the crumpets can, however, result in significant nisin loss. This involves heating on a hot plate for 3-5 minutes.

The trial described below demonstrated the heat-protective effect of encapsulation, ensuring a greater percentage of added nisin survived the baking process. Crumpets were prepared by a normal production method, with addition of nisin (as Nisaplin®) or encapsulated nisin (prepared by spray crystallization in accordance with the procedure of Example 5) to the batter before cooking on the hotplate. The crumpets (pH 5.6-6.0, water activity 0.8-0.9) were then incubated at ambient temperature (21° C.) for 5 days. Nisin levels in the crumpets were measured the following day by a bioassay method (see above).

Test Samples
1. Nisaplin® (Danisco). Nisin potency $1 \times 10^6$ IU/g
2. Encapsulated nisin sample NAP 03228 (Danisco). Nisin potency $5.36 \times 10^5$ Results of Crumpet Trial

| Test | Sample | Sample addition level | Actual nisin addition level | Initial nisin levels detected by bioassay | Detected nisin levels based on % of nisin addition | Average nisin levels as % of addition |
|---|---|---|---|---|---|---|
| 1 | Nisaplin ® (Unencapsulated nisin) | 200 mg/kg | 200 IU/g | 56 IU/g | 28% | 22% |
| 2 | | | | 32.2 IU/g | 16% | |
| 3 | Encapsulated nisin | 200 mg/kg | 94 IU/g | 49.3 IU/g | 52% | 51% |
| 4 | | | | 46.6 IU/g | 50% | |
| 5 | | 150 mg/kg | 71 IU/g | 45.4 IU/g | 64% | 65% |
| 6 | | | | 47.2 IU/g | 66% | |
| 7 | | 100 mg/kg | 47 IU/g | 32 IU/g | 68% | 66% |
| 8 | | | | 29.6 IU/g | 63% | |

The average residual nisin levels resulting from encapsulation were 61% compared to average residual nisin levels of 22% for unencapsulated nisin.

Example 7

Improved Nisin Levels in Processed Cheese

Encapsulated nisin (prepared by spray crystallization in accordance with the procedure of Example 5) and unencapsulated nisin (Nisaplin®, Danisco) were added to a commercial processed cheese formulation, after which samples of the processed cheese were subjected to a heating step of 10 minutes at core temperatures of 60° C., 80° C. and 100° C. After heating, the residual nisin levels were measured in the processed cheese, using heat/acid extraction and the horizontal agar diffusion method.

| | Residual nisin detected as a percentage of addition level | | |
|---|---|---|---|
| Sample | After 60° C. for 10 minutes | After 80° C. for 10 minutes | After 100° C. for 10 minutes |
| Unencapsulated nisin (Nisaplin ®) | 74% | 68% | 59% |
| Encapsulated nisin (of Example 5) | 75% | 73% | 72% |

-continued

| Sample | Residual nisin detected as a percentage of addition level | | |
|---|---|---|---|
| | After 60° C. for 10 minutes | After 80° C. for 10 minutes | After 100° C. for 10 minutes |
| Encapsulated nisin (of Example 2) | 90% | 84% | 75% |

The results demonstrate higher nisin levels after the heat treatment for encapsulated nisin samples compared to unencapsulated nisin samples.

Example 8

Improved Nisin Levels and Efficacy in a Pasta Meat Sauce due to Encapsulation Protection Encapsulated nisin (prepared by spray crystallization in accordance with the procedure of Example 5) and unencapsulated nisin (Nisaplin®, Danisco) were added to a Bolognese sauce, pH 5.69. This was prepared to the following recipe: lean minced beef (50.0 g), tinned tomatoes in tomato juice (48.9 g), starch (0.5 g), salt 0.4 g, sucrose (0.2 g). The minced beef was fried for 5 min until browned. The dry ingredients were mixed into the meat then the tomatoes were added. The sauce was simmered for 10 min then allowed to cool. A blender was used to produce a smooth sauce to facilitate sampling, the sauce was diluted to facilitate testing and the pH adjusted. Additions of nisin preparations, based on equivalent nisin potencies, were made at a level of 250 IU/g to the sauce, which was then pasteurised at a core temperature of 80° C. for 30 minutes.

Samples were then inoculated with a cocktail of Listeria monocytogenes strains (strain 272, CRA3930, 358, NCTC12426) at $10^2$ CFU/g. The nisin levels were assayed immediately using the horizontal agar diffusion method. Samples were stored at 8° C. and

| Nisin preparation | Initial nisin levels (IU/g) | Days until Listeria numbers reached $10^6$ CFU/g |
|---|---|---|
| Control | 0 | 5 |
| Unencapsulated nisin | 152 | 51 |
| Unencapsulated nisin | 160 | 52 |
| Encapsulated nisin | 178 | >98 |
| Encapsulated nisin | 199 | >98 |

The results show that a higher percentage of nisin survived the heat process if encapsulated and this had the result of better control of Listeria in the food.

Example 9

Improved Nisin Levels in a Raw Meat Matrix

To test the protective effect of encapsulation from nisin degradation or inactivation in raw meat, samples of encapsulated and unencapsulated nisin (as Example 8) were added to diced raw meat. Stock solutions of the nisin preparations were prepared in 0.02 M HCl, which was added to the meat. All nisin additions were equivalent, based on 200 IU/g. After overnight incubation at 4 and 20° C., the nisin levels were analysed by the horizontal well diffusion assay method (as above).

| Nisin preparation | Nisin detected after overnight incubation (IU/g) | |
|---|---|---|
| | 4° C. | 20° C. |
| Unencapsulated nisin (A) | 120 | 60 |
| Encapsulated nisin (C) | 169 | 136 |
| Encapsulated nisin (D) | 157 | 124 |

The results show that encapsulation helped to protect nisin from inactivation or degradation in the raw meat. After overnight incubation at 20° C., unencapsulated nisin levels dropped to 60 IU/g compared to 124-136 IU/g if encapsulated.

Natamycin

Example 10

Production of Encapsulated Natamycin by a Coacervation Process

First, a solution of gelatine (219 g, isoelectric point=8) in 6 liters of water at 50° C. was prepared. Secondly, a solution of 219 g of gum acacia was dissolved in 6 L of water at 50° C. The two solutions were mixed together and kept at 45° C. under vigorous stirring. 700 g of Natamax™ SF (Danisco) was added to the aqueous solutions and the pH was rapidly lowered to 4.0 using 1 M HCl, after which the temperature was lowered to 5° C. at the rate of approximately 1° C./min, maintaining the stirring throughout. 36 ml of an 1:1 aqueous solution of glutaraldehyde was added, the pH was re-adjusted to 8.5 using aqueous 1 M NaOH and then the temperature was increased back to 45° C. at a rate of approx 2° C./min. Finally, the whole mixture was spray dried in a spray tower using a double-fluid nozzle mounted in the fountain configuration, air inlet temperature of 180° C. and a spray rate to maintain the outlet air temperature of about 100° C.

In an alternatively process, 1 kg each of gum arabic and maltodextrin (DE 12) are dissolved in the aqueous mixture just prior to spray drying.

Example 11

Fluid Bed Encapsulation of Natamycin

Preprocessing

If the natamycin particle size is too fine (below 100 micrometers average), the powder is agglomerated to a larger average particle size for easier processing by fluidized bed. Larger average particle size not only makes the process easier, but also allow the use of less coating material while achieving the same protection as with more shell material. Natamycin is agglomerated in an suitable equipment such as a high shear mixer (such as a Lodige mixer using a binder solution (solution of sticky hydrocolloids such as alginate or maltodextrine) in order to obtain a dense powder of particle size above 150, preferably between 200-350 μm and bulk density above 0.4, preferably above 0.7 g/cm³.

Hot Melt Fluid Bed Encapsulation 3 kg of agglomerated natamycin is introduced into the coating chamber of a Aeromatic-Fielder MPI fluidized-bed microencapsulation unit and fluidized using inlet air flow rate of 80 cm/s and temperature of 43° C. A melted hydrogenated triglyceride kept at 85° C. is then sprayed onto the fluidized bed of antimicrobial using a peristaltic pump and a double fluid nozzle set a 2 bar and 2 m³ of air/h. The fat is applied at around 1 kg/h, in such a way to form a continuous layer of fat around each individual particles as the melted fat spread and solidifies on the particles. Enough fat is applied to reach a final product containing 30% fat and 70% natamycin.

Example 12

Extrusion Encapsulation of Natamycin

A mixture of 60 parts of corn starch, 25 parts of natamycin and 10 parts of polyethyleneglycol and 5 parts of water is mixed together and introduced in a clextral double-screw extruder, the first barrel heated to 40° C. The mass is treated at 100° C. for just a few seconds in barrels 2 and 3 then cooled down to 45° C. in barrels up to the die. Alternatively, a vacuum pump is installed on the last barrel so as to get rid of the water. The exiting rope is cut into pieces between 250 and 500 μm.

Example 13

Use of Encapsulated Natamycin in Orange Juice

Natamycin was encapsulated by a coacervation method as described in Example 10, using either gelatine and acacia as a shell material (NAP03015), or gelatine, acacia and maltodextrin (NAP03023).

The samples, together with natamycin as Natamax™ (Danisco) were added to orange juice (pH 3.85) and heated at 100° C. for 10 minutes. The residual natamycin levels in the juice before and after treatment were tested by HPLC. Samples were diluted in methanol for this assay.

The results are shown in Table 1.

The experiment shows that the microcapsule prevented release of natamycin, so that not all the estimated natamycin present could be detected before the heating step. After heating, the encapsulated natamycin showed recovery levels higher than with the unprotected natamycin.

TABLE 1

Heat protection of encapsulated natamycin in orange juice

| Sample | Theoretical payload based on pure natamycin W/w | Addition level | Actual natamycin added (based on estimated payload) | Detectable natamycin in juice before heating/ppm (% of natamycin added) | Detectable natamycin in juice after heating/ppm (% of natamycin added) |
|---|---|---|---|---|---|
| Natamax™ | 50% | 40 ppm | 20 ppm | 19.7 (98.5%) | 5.2(26%) |
| NAP03015 | 80% | 80 ppm | 64 ppm | 33.0(52%) | 21.1(33%) |
| NAP03023 | 36% | 140 ppm | 50 ppm | 14.1(28%) | 14.8(30%) |

Example 14

Use of Encapsulated Natamycin in Vinaigrette

A vinaigrette dressing was prepared containing water (494.6 ml), 10% vinegar (220 ml), sugar (90 g) and salt (10 g), pH 2.6. Additions of encapsulated and unencapsulated natamycin were made as shown in Table 2. Sample NAP03015 was encapsulated by coacervation as described in Example 10. Sample NAP03007 was encapsulated by spray-cooling with a shell material of triglyceride.

TABLE 2

| Sample | Theoretical payload of pure natamycin | Addition level | Actual natamycin added (based on estimated payload) |
|---|---|---|---|
| Natamax™ | 50% | 40 ppm | 20 ppm |
| NAP03007 | 40% | 100 ppm | 40 ppm |
| NAP03015 | 80% | 50 ppm | 40 ppm |

The vinaigrette was incubated at 25° C., and samples assayed for residual natamycin content at regular intervals. The vinaigrette was shaken before each sampling, and a sample taken for 14PLC analysis, which was diluted 1:1 in methanol. The natamycin levels found in the mixed vinaigrette and in the water layer only are shown in Table 3 and 4. The results show that encapsulation protects the natamycin from acid degradation in the vinaigrette, allowing a slow release of the preservative with time. Sample NAP03007 contained only a small amount of unencapsulated natamycin at the beginning of the experiment.

TABLE 3

Detectable natamycin in a vinaigrette dressing at 25° C.
(Sample taken from homogenised dressing)

| | Natamycin percentage of estimated addition level (based on estimated addition level) | | |
|---|---|---|---|
| Days at 25° C. | Natamax | NAP03007 | NAP03015 |
| 0 | 70.5% | 1.8% | 70% |
| 1 | 38% | 4.5% | 50.5% |
| 6 | 22.5% | 19.3% | 23.8% |
| 9 | 13% | 29.5% | 36.5% |
| 14 | 10% | 40.8% | 29% |
| 21 | 4.5% | 17.5% | 10.2% |

TABLE 4

Detectable natamycin from the water phase
of a vinaigrette dressing at 25° C.

| | Natamycin percentage of estimated addition level (based on estimated addition level) | | |
|---|---|---|---|
| Days at 25° C. | Natamax | NAP03007 | NAP03015 |
| 0 | 48% | 1.5% | 13% |
| 1 | 25% | 2.25% | 15.3% |
| 6 | 8% | 2.75% | 7.8% |

TABLE 4-continued

Detectable natamycin from the water phase
of a vinaigrette dressing at 25° C.

Natamycin percentage of estimated addition level
(based on estimated addition level)

| Days at 25° C. | Natamax | NAP03007 | NAP03015 |
|---|---|---|---|
| 9 | 8% | 13% | 5% |
| 14 | 6% | 13.5% | 5.3% |
| 21 | 2.5% | 11.8% | 4.3% |

Example 15

Use of Encapsulated Natamycin in Bread

A bread is made by preparing a dough containing flour, water, yeast, salt and a dough conditioner. Included in the dough mix is either natamycin or encapsulated natamycin or neither. Both natamycin preparations are added at a potency dosage of 12 ppm (0.00 12%) on flour weight and these are added together with the other dry ingredients. All ingredients are mixed together thoroughly for between 3 and 10 minutes.

The dough is then given a short resting period after mixing (approx. 5 to 10 minutes) followed by scaling at the required weight. A second rest period is then applied following a second moulding in shape the dough as desired. The dough is then placed into a tin or tray. A leavening period for about 50 minutes at 85% relative humidity at 40° C. then follows.

The fully proved dough is then baked at between 190 and 230° C. for approximately 15 to 30 minutes.

Bread containing unencapsulated natamycin shows poor leavening, whereas leavening of the encapsulated natamycin proceeds in a similar fashion to the control bread not containing any natamycin. This demonstrates the benefit of encapsulation, which prevents the natamycin from inhibiting the yeast fermentation reaction.

When the bread is cool, the natamycin content in the bread is assayed. The natamycin content from bread containing encapsulated natamycin is higher than that in the bread containing unencapsulated natamycin, indicating the heat protective benefit of encapsulated natamycin. The bread is then sliced and observed over the normal shelf life period for growth of moulds. Delay of mould spoilage is observed for bread containing natamycin. This extension of shelf life is greater for bread containing encapsulated natamycin, which is a reflection of the higher natamycin levels surviving the baking process.

Example 16

Encapsulation of Natamycin in a Double Shell

First, a solution of 15 g kappa-carrageenan in 1000 ml of phosphate buffer at pH 7.0 is prepared at 85° C. To this is added 300 g of commercial natamycin (Natamax™ SF, Danisco). The resulting mixture is thoroughly mixed. At the same time, a mixture of 1333 g of a vegetable triglyceride (GRINDSTED® PS 101, m.p. 58° C.) and 73 g of acetylated emulsifier (Acetem 50 00) is melted at 85° C. in a water bath. The melted fat mixture is kept under homogenization (Silverson mixer, 8000 rpm) as the aqueous mixture is slowly incorporated. The homogenization is maintained for 5 minutes after the whole aqueous mixture is added and then a solution of 3 g of polysorbate 80 in 40 ml of water is added under constant mixing. The resulting low-viscosity water-in-oil emulsion is then immediately spray cooled in a Niro spray tower using the following parameters: inlet air temperature 10° C., outlet air temperature 28° C., rotating atomization wheel speed 10 000 rpm. A free flowing powder is obtained. The incorporation of encapsulated natamycin in an orange juice results in a much more stable natamycin formulation compared to when unencapsulated natamycin is used in the liquid, thus dramatically improving survival rate of the natamycin in the beverage. The encapsulated natamycin, as presented in this example, is released at a rate of only 7% after three days.

REFERENCES

Background

Davies, E. A., Bevis, H. E., Potter, R., Harris, J., Williams, G. C. and Delves-Broughton, J. 1998. The effect of pH on the stability of nisin solutions during autoclaving. Letters in Applied Microbiology 27: 186-187.

De Vuyst, L., and Vandamme, E. J. 1994. Nisin, a lantibiotic produced by *Lactococcus* lactis subsp lactis: properties, biosynthesis, fermentation and applications. In Bacteriocins of Lactic Acid Bacteria. Microbiology, Genetics and Applications, eds. L. de Vuyst and E. J. Vandamme pp 151-221. London: Blackie Academic and Professional.

Rose, N. L., Palcic, M. M., Sporns, P. and McMullen. 2002. Nisin: a novel substrate for glutathione S-transferase isolated from fresh beef. Journal of Food Safety 67:2288-2293.

Rose, N. L., Sporns, P., Stiles, M. E., and McMullen, L. 1999. Inactivation of nisin by glutathione in fresh meat. J. Food Science 64: 759-762.

Rose, N. L., Sporns, P., Dodd, H. M., Gasson, M. J., Mellon, F. A., and McMullen, L. 2003. Involvement of dehydroalanine and dehydrobutyrine in the addition of glutathione to nisin. J. Agric Food chem. 51: 3174-3178.

Susiluoto, T., Korkeala, H., and Bjorkroth, K. J. 2003. Leuconstoc gasicomitatum is the dominating lactic acid bacterium in retail modified atmosphere packaged marinated broiler meat strips on sell by day. International Journal of Food Microbiology 80: 89-97.

Thomas, L. V., Clarkson, M. R., and Delves-Broughton, J. 2000. Nisin. In: Natural Food Antimicrobial Systems. Ed. A. S. Naidu. Pp 463-524. USA: CRC Press.

Varnam, A. H., and Sutherland, J. P. 1995. Meat and Meat Products. Technology, Chemistry and Microbiology. Chapman & Hall. London.

Axelsen, L. 1998. Lactic acid bacteria: classification and physiology'. In: Salminen, S. and von Wright, A. In: Lactic Acid Bacteria. $2^{nd}$ Ed. New York, Marcel Dekker, pp 1-72.

Delves-Broughton, J. 1990. Nisin and its uses as a food preservative. Food Technol. 44: 100, 102, 104, 106, 108, 111-112, 117.

Hoover, D. G. 1993. Bacteriocins with potential for use in foods. In: Antimicrobials in Foods. Ed: P. M. Davidson and A. L. Branen. Marcel Dekker, USA.

Hurst, A. 1981. Nisin. Adv. Appl. Microbiol. 27: 85-123

Hurst, A. 1983. Nisin and other inhibitory substances from lactic acid bacteria. In Antimicrobials in Foods. Eds. A. L. Branen and P. M. Davidson, pp. 327-351. New York: Marcel Dekker.

Naidu, A. S. (Ed.) 2000. Natural Food Antimicrobial Systems. USA: CRC Press.

Ray, B., and Miller, K. W. 2003. Bacteriocins other than nisin: the pediocin-like cystibiotics of lactic acid bacteria. In: Natural Antimicrobials for the Minimal Processing of Foods. Ed: Sibel Roller. CRC Press, USA.

Ray, B. and Daeschel, M. A. 1994. Bacteriocins of starter culture bacteria. In: Natural Antimicrobial Systems and Food Preservation. 1994. Ed: Dillon, V. M. and Board, R. G. CAB International, UK, pp 133-166.

Ray, B., Miller, K. W. and Jain, M. K. 2001. Bacteriocins of lactic acid bacteria. Indian Journal of Microbiology 41: 1-21.

Thomas, L. V., and Delves-Broughton, J. 2001. New advances in the application of the food preservative nisin. Research Advances in Food Science 2:11-22

Wessels, S., Jelle, B., and Nes, I. F. 1998. Bacteriocins of the Lactic Acid Bacteria: An Overlooked Benefit for Food. Danish Toxicology Centre, Denmark.

Nisin Injection into Meat

Caserio, G., Ciampella, A., Gennari, M., and Barluzzi, A. M. 1979. Industrie Alimentari 18:1-12. Research on the use of nisin in cooked, cured meat products.

Gola, J. 1962. 'Preservation of canned hams stored at unusual temperatures'. Collected Reports of Research Institute for Meat (Bmo) 10: 239-244.

Taylor and Somers. 1985. Evaluation of the antibotulinal effectiveness of nisin in bacon. Journal of Food Protection 48:949-952.

Usborne, W R, Collins-Thompson, D L and Wood, D S. 1986. Sensory evaluation of nisin-treated bacon. Can. Inst. Food Sci. Technol. J. 19: 3840.

US 2003/0108648 A1 2003 (Rhodia) 'Composition having bacteriostatic and bactericidal activity against bacterial spores and vegetative cells and process for treating foods therewith'. Ming, King and Payne.

U.S. Pat. No. 6,207,210 B1. (Rhodia). 'Broad-range antibacterial composition and process of applying to food surfaces. Bender, King, Ming and Weber. Patent filed Mar. 27, 2001.

EP 0 770336 A1. European patent application. 1995. Nestle. Process for preparing a meat product.

Internet article [http://www.nai.usda.gov/fsrio/ppd/ars010f.htm] on work at Meat Research Unit, MARC mentioned a presentation on 'antibacterial properties of injectable beef marinades'. This seems aimed at E. coli O157 and would be unlikely to be nisin.

Encapsulation of Nisin

Benech, R.-O, Kheadr, E. E., Laridi, R., and Fliss, I. 2002. Inhibition of Listeria innocua in cheddar cheese by addition of nisin Z in liposomes or by in situ production in mixed culture. Applied & Environmental Microbiology 68: 3683-3690.

Bower, C. K., McGuire, J. and Daeschel, M. A. 1995. Influences on the antimicrobial activity of surface-adsorbed nisin. J. Industrial Microbiology 15: 227-233.

Bower, C. K., McGuire, J. and Daeschel, M. A. 1995. Supression of Listeria monocytogenges colonization following adsorption of nisin onto silica surfaces. Appl. Environ. Microbiol 61: 992-997.

Cahill, S. M., Upton, M. E., and McLoughlin, A. J. 2001. Bioencapsulation technology in meat preservation. In: Applied Microbiology. Eds Durieux, A., and Simon, J. P. Dordrecht: Kluwer Academic Publishers. Pp 239-266.

Cutter, C. N., and Siragusa, G. R. 1996. Reduction of Brochothrix thermosphacta on beef surfaces following immobilization of nisin in calcium gels. Letts. Applied Microbiology 23: 9-12.

Cutter, C. N., and Siragusa, G. R. 1997. Growth of Brochothrix thermosphacta in ground beef following treatments with nisin in calcium alginate gels. Food Microbiol 14: 425-430.

Cutter, C. N., and Siragusa, G. R. 1998. Incorporation of nisin into meat binding system to inhibit bacteria on beef surfaces. Letts. Applied Microbiol. 27: 19-23.

Daeschel, M. A., McGuire, J., and Al-Makhlafi, H. 1992. Antimicrobial activity of nisin adsorbed to hydrophilic and hydrophobic silicon surfaces. J. Food Protection 55: 731-735.

Degnan, A. J., and J. B. Luchansky. 1992. Influence of beef tallow and muscle on the antilisterial activity of pediocin AcH and liposome-encapsulated pediocin AcH. J. Food Protection 55: 552-554.

Degnan, A. J., Buyong, N., and Luchansky, J. B. 1993. Antilisterial activity of pediocin AcH in model food systems in the presence of an emulsifier or encapsulated within liposomes. International Journal of Food Microbiology 18:127-138.

Laridi, R., Benech, R. O., Vuillemard, J. C., Lacroix, C., Fliss, I. 2003. Liposome encapsulated nisin Z: optimisation, stability and release during milk fermentation. International Dairy Journal. 13: 325-336.

Lante, A., Crapisi, A., Pasini, G., amd Scalabrini, P. 1994. Nisin released from immobilization matrices as antimicrobial agent. Bitoechnol. Letts 16: 293-298.

Lante, A., Crapisi, A., Zannoni, S., and Spettoli, P. 2000. Nisin released from membrane reactor for dairy Clostridia control. Industrie Alimentari XXXIX: 589-595.

Robinson, S. K. 1993. Regulatory aspects of bacteriocin use. In Bacteriocins of Lactic Acid Bacteria. Ed. Hoover, D G and Steenson, L. R. pp 233-247. London: Academic Press.

Shahidi, F. and Han, X. G. 1993. Encapsulation of food ingredients. Critical Review in Food Science and Nutrition 33: 501-547.

Wan, J., Hickey, M. W. and Coventry, M. J. 1995. Continuous production of bacteriocins, brevicin, nisin and pediocin, using calcium alginate-immobilised bacteria. Journal of Applied Bacteriology 79: 6712-676.

Wan, J., Gordon, J. B., Muirhead, K., Hickey, M. W., and Coventry, M. J. 1997. Incorporation of nisin in microparticles of calcium alginate. Letters in Applied Microbiology 24: 153-158.

WO 02/094224 A1. Bioactive agent+bioactive carbohydrate polymer. Not relevant

WO 9856402. Ambi. Oral formulation of nisin with a salt in a coating to give release into the colon to treat bacterial infections.

WO 9720473. Wrigley. Chewing gum with improved flavour using nisin, coating to make a pellet.

GB2388581A. Microcapsules and method for preparing them. Encapsulation method.

Nisin Degradation by Proteases

Alifax, R. and Chevalier, R. 1962. Study of the nisinase produced by Streptococcus thermophilus. J. Dairy Res 29: 233

Campbell, L. L. 1959. Effect of subtilin and nisin on spores of Bacillus coagulans. J. Bacteriol. 77: 766.

Jarvis, B. and Mahoney, R. R. 1969. Inactivation of nisin by alpha chymotrypsin. Journal of Dairy Science 52: 1448-1450.

Jarvis, B. 1967. Resistance to nisin and production of nisin-inactivating enzymes by several Bacillus species. J. Gen Microbiol 47: 33.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry, biology, food science or related fields are intended to be within the scope of the following claims

The invention claimed is:

1. An antimicrobial material in an encapsulated form, comprising (i) a core comprising an antimicrobial material is at least selected from nisin and natamycin, wherein the core includes a lipid and (ii) a shell of encapsulating material, wherein the shell comprises a triglyceride, wherein the shell of encapsulating material is impermeable to the antimicrobial material and comprises a hydrophobic shell material having a melting point above about 45° C., and wherein the shell prevents, reduces or inhibits heat degradation of the antimicrobial material when heated to a temperature of at least 60° C.

2. An antimicrobial material according to claim 1 wherein the antimicrobial material is present in an amount to provide a microbicidal or microbiostatic effect.

3. An antimicrobial material according to claim 2 wherein the microbicidal or microbiostatic effect is a bactericidal or bacteriostatic effect.

4. An antimicrobial material according to claim 3 wherein the bactericidal or bacteriostatic effect is in respect of Gram-positive bacteria.

5. An antimicrobial material according to claim 3 wherein the bactericidal or bacteriostatic effect is in respect of an organism selected from species of *Bacillus*, species of *Clostridium, Listeria monocytogenes*, lactic acid bacteria, *Leuconostoc, Carnobacterium, Enterococcus; Brochothrx thermosphacta* and *Lactobacillus* species.

6. An antimicrobial material according to claim 3 wherein the bactericidal or bacteriostatic effect is in respect of *Listeria monocytogenes*.

7. An antimicrobial material according to claim 1 wherein the shell provides sustained release of the antimicrobial material from the encapsulated antimicrobial material.

8. An antimicrobial material according to claim 1 wherein the shell releases the antimicrobial material from the encapsulated antimicrobial material under predetermined conditions.

9. An antimicrobial material according to claim 1 wherein the shell releases the antimicrobial material from the encapsulated antimicrobial material on contact with a foodstuff.

10. An antimicrobial material according to claim 9 wherein the foodstuff is a marinade.

11. An antimicrobial material according to claim 1 wherein the shell of the encapsulated antimicrobial material is capable of withstanding injection.

12. An antimicrobial material according to claim 1 wherein the shell of the encapsulated antimicrobial material is capable of withstanding a pressure of greater than 1.5 bar.

13. An antimicrobial material according to claim 1 wherein the encapsulated antimicrobial material is a particulate form.

14. An antimicrobial material according to claim 1 wherein the encapsulated antimicrobial material has an average particle size of less than 150 μm.

15. An antimicrobial material according to claim 1 wherein the shell provides sustained release of the antimicrobial material from the encapsulated antimicrobial material.

16. An antimicrobial material according to claim 1 wherein the triglyceride is a vegetable triglyceride.

17. An antimicrobial material according to claim 1 wherein the encapsulated antimicrobial material is prepared by a process selected from spray cooling, and fluidised bed coating.

18. An antimicrobial material according to claim 1 wherein the encapsulated antimicrobial material further comprises a chelator.

19. An antimicrobial material according to claim 18 wherein the chelator is selected from EDTA, citric acid, monophosphates, diphosphates, triphosphates and polyphosphates.

20. An antimicrobial material according to claim 18 or 19 wherein the chelator enhances the antimicrobial activity and/or antimicrobial spectrum of the antimicrobial material.

21. An antimicrobial material according to claim 18 wherein the chelator enhances the antimicrobial activity and/or antimicrobial spectrum of the antimicrobial material in respect of Gram-negative bacteria.

22. A composition comprising (i) an encapsulated antimicrobial material as defined in claim 1;

(ii) a carrier.

23. A composition according to claim 22 wherein the carrier is or comprises brine.

24. A composition according to claim 22 wherein the carrier and the encapsulated antimicrobial material have substantially the same density.

25. A composition according to claim 22 wherein the encapsulated antimicrobial material is modified to have substantially the same density as the carrier.

26. A composition according to claim 25 wherein the encapsulated antimicrobial material is modified by contacting the encapsulated antimicrobial material with oil.

27. A composition according to claim 26 wherein the oil is brominated oil.

28. A composition according to claim 26 wherein the carrier is modified to have substantially the same density as the encapsulated antimicrobial material.

29. A composition according to claim 28 wherein the carrier comprises xanthum gum.

30. A composition according to claim 22 wherein the carrier comprises an emulsifier.

31. A protected foodstuff comprising (i) a foodstuff, and (ii) an antimicrobial material according to claim 1 or a composition according to claim 22.

32. A protected foodstuff according to claim 31 wherein the foodstuff is selected from raw meat, cooked meat, raw poultry products, cooked poultry products, raw seafood products, and cooked seafood products.

33. A protected foodstuff according to claim 32 wherein the foodstuff is raw meat.

34. A protected foodstuff according to claim 32 wherein the foodstuff is a raw or cooked poultry product.

35. A protected foodstuff according to claim 31 or 32 wherein the foodstuff comprises whole meat muscle.

36. An antimicrobial material according to claim 1 wherein the shell consists of a triglyceride.

37. An antimicrobial material according to claim 1 wherein the core is solid.

38. A process for introducing an antimicrobial material as defined in claim 1 into a foodstuff comprising (i) providing the antimicrobial material in an encapsulated form comprising a core of antimicrobial material and shell of encapsulating material; and (ii) introducing the encapsulated antimicrobial material into or onto the foodstuff.

39. A process according to claim 38 wherein the encapsulated antimicrobial material is introduced into or onto the foodstuff by (a) injecting the encapsulated antimicrobial material into the foodstuff or (b) tumbling the encapsulated antimicrobial material with the foodstuff.

40. A process according to claim 38 or 39 wherein the encapsulated antimicrobial material is introduced into the foodstuff by injecting the encapsulated antimicrobial material into the foodstuff.

41. A process according to claim 38 or 39 wherein the encapsulated antimicrobial material is introduced into or onto the foodstuff by tumbling the encapsulated antimicrobial material with the foodstuff.

42. A process according to claim 38 wherein
(i) the antimicrobial material is at least nisin,
(ii) the antimicrobial material is present in an amount to provide a microbicidal or microbiostatic effect in respect of *Listeria monocytogenes*,
(iii) the shell is selected to prevent, reduce or inhibit degeneration or inactivation of the antimicrobial material by one or more factors selected from heat degradation, pH induced degradation, protease degradation and glutathione adduct formation; and
(iv) the foodstuff is selected from raw meat products, cooked meat products, raw seafood products, cooked seafood products, raw poultry products and cooked poultry products.

43. A foodstuff prepared by a process as defined in claim 38.

44. A foodstuff obtainable by a process as defined in claim 38.

45. An antimicrobial material in an encapsulated form, comprising (i) a core comprising an antimicrobial material selected from nisin and natamycin, wherein the core includes a lipid and (ii) a shell of encapsulating material, wherein the shell prevents, reduces or inhibits heat degradation of the antimicrobial material when heated to a temperature of at least 60° C.

* * * * *